(12) United States Patent
Yoo et al.

(10) Patent No.: US 9,676,448 B2
(45) Date of Patent: Jun. 13, 2017

(54) HUB-EMBEDDED MULTI-STAGE TRANSMISSION

(71) Applicant: MBI CO., LTD., Cheongwon-gun, Chungcheongbuk-do (KR)

(72) Inventors: Hyuk Yoo, Cheongju-si (KR); Tae-Jin Jung, Cheongju-si (KR); Seong-Cheol An, Cheongju-si (KR)

(73) Assignee: MBI CO., LTD., Chungcheongbuk-do (KR)

( * ) Notice: Subject to any disclaimer, the term of this patent is extended or adjusted under 35 U.S.C. 154(b) by 55 days.

(21) Appl. No.: 14/761,960

(22) PCT Filed: Jan. 21, 2014

(86) PCT No.: PCT/KR2014/000573
§ 371 (c)(1),
(2) Date: Jul. 20, 2015

(87) PCT Pub. No.: WO2014/123312
PCT Pub. Date: Aug. 14, 2014

(65) Prior Publication Data
US 2016/0075403 A1 Mar. 17, 2016

(30) Foreign Application Priority Data

Feb. 6, 2013 (KR) .................. 10-2013-0013273

(51) Int. Cl.
*B62M 11/16* (2006.01)
*F16H 3/54* (2006.01)
(52) U.S. Cl.
CPC ............... *B62M 11/16* (2013.01); *F16H 3/54* (2013.01); *F16H 2200/0034* (2013.01);
(Continued)

(58) Field of Classification Search
None
See application file for complete search history.

(56) References Cited

U.S. PATENT DOCUMENTS

2011/0009231 A1* 1/2011 Shoge .................. B60B 27/0005
475/297

FOREIGN PATENT DOCUMENTS

| JP | 7014148 Y2 | 4/1995 |
|---|---|---|
| JP | 2005-199904 A | 7/2005 |
| KR | 10-0915378 B1 | 9/2009 |

OTHER PUBLICATIONS

Search Report for International Application No. PCT/KR2014/000573.

* cited by examiner

*Primary Examiner* — Justin Holmes
*Assistant Examiner* — Timothy M Hannon
(74) *Attorney, Agent, or Firm* — LRK Patent Law Firm

(57) ABSTRACT

A compact hub-embedded multi-stage transmission is provided which is implemented to achieve multi-stage shifting by using a multi-stage planetary gear set having a one stage or two or more stages and a double one-way clutch in order to impart an overrunning function during inertial travel, and at the same time, to allow rapid shifting to be made even with a small force for manipulating a shift lever by means of use of a forced shift function even in a driven travel state. Accordingly, product marketability can be maximized, and rapid shifting can be made even with a small force for manipulating a shift lever by means of use of a forced shift function even in a driven travel state, thereby considerably improving shifting accuracy.

7 Claims, 15 Drawing Sheets

(52) U.S. Cl.
CPC ............... *F16H 2200/2005* (2013.01); *F16H 2200/2033* (2013.01); *F16H 2200/2064* (2013.01); *F16H 2200/2071* (2013.01); *F16H 2200/2087* (2013.01); *F16H 2200/2094* (2013.01)

(a)

(b)

(c)

(d)

(a)

(b)

(a)

(b)

(a)  (b)

(c)

(a)

(b)

(c)

HUB-EMBEDDED MULTI-STAGE TRANSMISSION

TECHNICAL FIELD

The present invention relates to a hub-embedded multi-stage transmission, and more particularly, to a compact hub-embedded multi-stage transmission that is implemented to achieve multi-stage shifting by using a multi-stage planetary gear set having a one stage or two or more stages and a double one-way clutch in order to impart an overrunning function during inertial travel, and at the same time, to allow rapid shifting to be made even with a small force for manipulating a shift lever by means of use of a forced shift function even in a driven travel state, thereby maximizing product marketability and considerably improving shifting accuracy.

BACKGROUND ART

Generally, transportation apparatus such as a bicycle, a wheelchair, an automobile and a scooter, which has wheels and travels using various kinds of driving forces such as man power or an electromotive force, is provided with a transmission for enhancing a travel performance.

Such a transmission performs shifting in multiple stages from a high speed to a low speed according to the manipulation of a rider or user to obtain torque or speed required under a travel condition.

In particular, recently, a planetary gear set consisting of a sun gear, planetary gears, a ring gear and a carrier is provided in a hub shell to achieve a compact configuration, thereby performing shifting in multiple stages and preventing the gears from being exposed to the outside.

However, there are technical problems in that a conventional transmission using a planetary gear set has a smaller number of shifting stages in spite of a complicated structure, and in particular, a pawl which has been strongly confined by a driven load cannot be smoothly controlled during shifting manipulation in a loaded, driven travel state, thereby resulting in unsmooth shifting.

DISCLOSURE

Technical Problem

The present invention is conceived to solve the above problems and thus intends to provide a hub-embedded multi-stage transmission that is configured to be compact using a multi-stage planetary gear set having a one stage or two or more stages and a double one-way clutch so as to maximize product marketability and allows rapid shifting to be made even with a small force for manipulating a shift lever by means of use of a forced shift function even in a loaded, driven travel state so as to considerably improve shifting accuracy.

Technical Solution

The present invention provides a hub-embedded multi-stage transmission, including: a shaft fixed to a vehicle body, a driver for receiving a rotational force, and a hub shell for outputting the rotational force, wherein the driver and the hub shell are rotatably located on an outer periphery of the shaft; a shifting unit for changing the rotational force input from the driver and outputting the changed rotational force to the hub shell, wherein the shifting unit includes a planetary gear set composed of a sun gear, a planetary gear, a carrier and a ring gear provided within the hub shell, a first output clutch provided as a one-way clutch between the carrier and the hub shell, and a second output clutch provided as two one-way clutches integrally formed with each other to have a certain difference in phase angle and positioned between the driver and the ring gear and between the ring gear and the hub shell, respectively, whereby the rotational force of the driver is transferred to the ring gear or the rotational force of the ring gear is transferred to the hub shell depending on a difference in rotational speed; and a control unit for controlling shifting of the shifting unit, wherein the control unit includes a circumferential pawl control member circumferentially rotatable to control a plurality of pawls located in pawl seating portions formed on an outer peripheral surface of the shaft depending on manipulation of a shift lever, thereby selectively restricting the rotation of the sun gear, and an axial pawl control member axially movable to control pawls provided on an inner peripheral surface of the driver depending on the manipulation of the shift lever, thereby selectively transferring the rotation of the driver to the carrier.

Further, the second output clutch preferably may include unidirectionally inclined recesses formed to have a certain difference in phase angle on the inner and outer peripheral surfaces of the ring gear; and a cage for rotationally supporting a plurality of rollers to be located within the unidirectionally inclined recesses, wherein the rollers located on an inner periphery of the cage and the rollers located on an outer periphery of the cage are integrally formed with the cage to maintain a certain difference in phase angle, whereby the second output clutch includes a double one-way clutch having an inner side one-way clutch formed between the outer peripheral surface of the driver and the inner peripheral surface of the ring gear and an outer side one-way clutch formed between the outer peripheral surface of the ring gear and the inner peripheral surface of the hub shell.

In addition, the planetary gear may include a one-stage planetary gear or a multi-stage planetary gear having two or more stages, and the pawls and the sun gear may further configured depending on the number of stages of the planetary gear, so that an output can be obtained with the number of, shift stages of "(2×the number of stages of the planetary gear)+1".

In particular, the control unit may include a cable connecting member, wherein a cable to be withdrawn by means of the manipulation of the shift lever is connected to the cable connecting member, and the cable connecting member is rotationally supported on the outer peripheral surface of the shaft; an intermediate connecting member engaged with an inner peripheral surface of the cable connecting member to be integrally rotated; a penetrating connecting member assembled on an inner peripheral surface of the intermediate connecting member to be integrally rotated, wherein the penetrating connecting member is unidirectionally and elastically rotated by a return spring; an angle control member fitted into the penetrating connecting member to be controlled to be integrally rotated, wherein helical slant surfaces are formed to one side of the angle control member; a circumferential pawl control member connected to the angle control member for controlling the plurality of pawls located on the pawl seating portions of the shaft depending on the rotation of the angle control member; and an axial pawl control member guided by an axial guide groove of a guide member fixed to the shaft so that the axial pawl control member may be axially moved, wherein the axial pawl control member is axially moved along the helical slant surfaces depending on the rotation of the angle control member to control the pawls provided on the inner peripheral surface of the driver.

And, the axial pawl control member may have a generally circular outer peripheral surface with axially inclined surface sections and a subsequent circular surface section along the axial direction of the outer peripheral surface so as to come into contact with the pawls provided on the inner peripheral surface of the driver, so that upon movement of the axial pawl control member in one direction, the axial pawl control member is spaced away from the pawls provided on the inner peripheral surface of the driver and the pawls provided on the inner peripheral surface of the driver are allowed to be erected, and upon return of the axial pawl control member in an opposite direction by the axial return spring, the pawls provided on the inner peripheral surface of the driver are caused to be laid down by the inclined surface sections and then remain in the laid-down state by the circular surface section of the outer peripheral surface.

In particular, the control unit may include a circumferential forced shift means, wherein the circumferential forced shift means includes a plurality of rotation restricting protrusions and a plurality of unidirectionally inclined recesses formed on an outer peripheral surface of the circumferential pawl control member; rotation restricting depressions formed on an outer peripheral edge of the angle control member for accommodating the rotation restricting protrusions with a free play; a plurality of rollers supported in a radially floatable manner by the angle control member; and a circumferential return spring connected between the circumferential pawl control member and the angle control member for elastically supporting the circumferential pawl control member to be rotated in one direction with respect to the angle control member, and the hub-embedded multi-stage transmission may have a circumferential forced shift function ensuring that as a difference in phase angle between the angle control member and the circumferential pawl control member is generated, the rollers are forcibly moved out of the unidirectionally inclined recesses formed on the outer peripheral surface of the circumferential pawl control member positioned inwards with respect to inner peripheries of the rollers and rotated, so as to form a forced shift clutch that is in contact with an inner peripheral surface of the carrier, thereby forcibly rotating the circumferential pawl control member to cause at least one of the plurality of pawls located in the pawl seating portions of the shaft to be forcibly laid down.

In addition, the hub-embedded multi-stage transmission according to the present invention may further include an axial forced shift means constructed such that the axial pawl control member is formed with pawl accommodating grooves circumferentially distributed to form a polygon and led to the circular surface section of the outer peripheral surface, so that the pawl accommodating groove can accommodate the pawls provided on the inner peripheral surface of the driver in their erected state and guide the pawls to the circular surface section of the outer peripheral surface, thereby forcibly causing the pawls provided on the inner peripheral surface of the rotating driver to be laid down.

Advantageous Effects

The present invention is a novel invention by which a compact hub-embedded multi-stage transmission can be implemented using a multi-stage planetary gear set having a one stage or two or more stages and a double one-way clutch so as to maximize product marketability, and rapid shifting can be made even with a small force for manipulating a shift lever by means of use of a forced shift function even in a driven travel state, thereby considerably improving shifting accuracy.

DESCRIPTION OF REFERENCE NUMERALS

| | |
|---|---|
| 100: shaft | 101, 102, 104, 105: pawl seating portion |
| 200: driver | 203: pawl seating portion |
| 210: sprocket | 300: hub shell |
| 310: dust cover | 400: shifting unit |
| 410: planetary gear set | 411a: first sun gear |
| 411b: second sun gear | 412: planetary gear |
| 412a: larger-diameter portion | 412b: smaller-diameter portion |
| 413: carrier | 413b: unidirectionally inclined recess |
| 414: ring gear | |
| 414a, 414b: unidirectionally inclined recess | |
| 420: first output clutch | 430: second output clutch |
| 431a, 431b: roller | 433: cage |
| 500: control unit | 501: first pawl |
| 502: second pawl | 503: third pawls |
| 504: fourth pawl | 505: fifth pawl |
| 510: circumferential pawl control member | |
| 511, 512, 514, 515: groove | |
| 516: rotation restricting protrusion | 517: unidirectionally inclined recess |
| 520: axial pawl control member | 521: pawl accommodating groove |
| 523, 524: inclined surface section | 530: cable connecting member |
| 532: intermediate connecting member | |
| 540: penetrating connecting member | |
| 550: angle control member | 551: helical slant surface |
| 553: rotation restricting depression | |
| 554: roller | |
| 560: guide member | 561: axial guide groove |
| 801: axial return spring | 802: circumferential return spring |
| 803: return spring | 901, 902: cone nut |
| 903, 904, 905: bearing | |

BEST MODE

Figure 1:
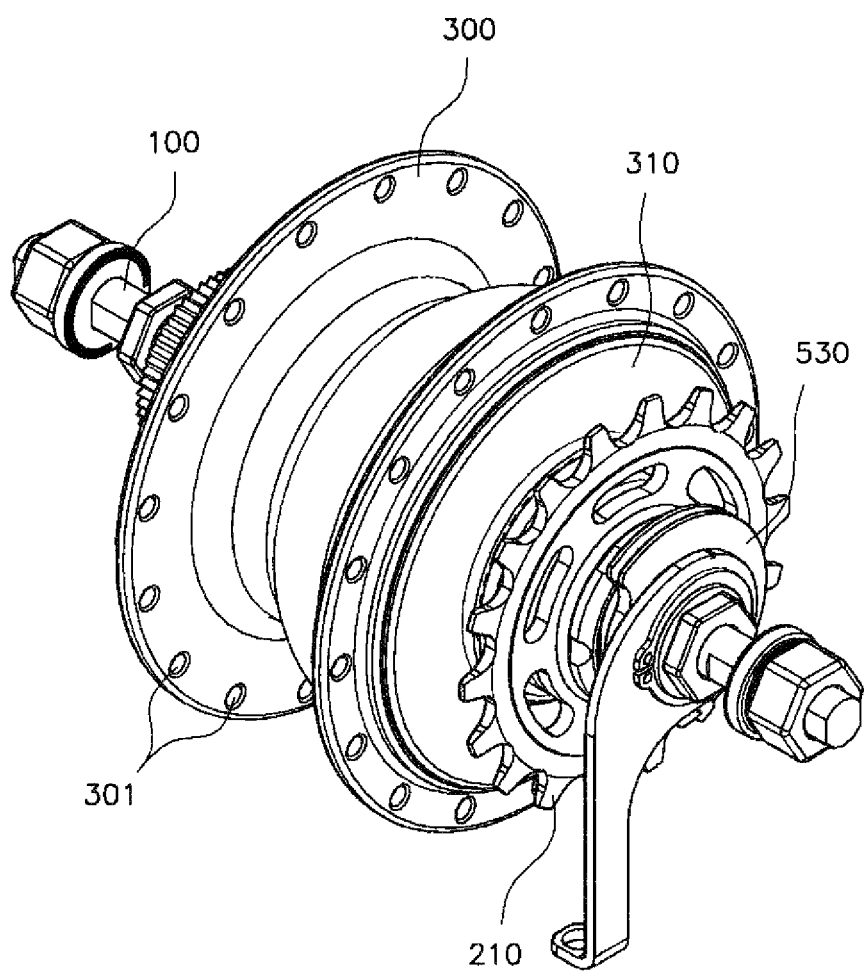
FIG. 1 is a perspective view showing a hub-embedded multi-stage transmission according to the present invention.
Figure 2:
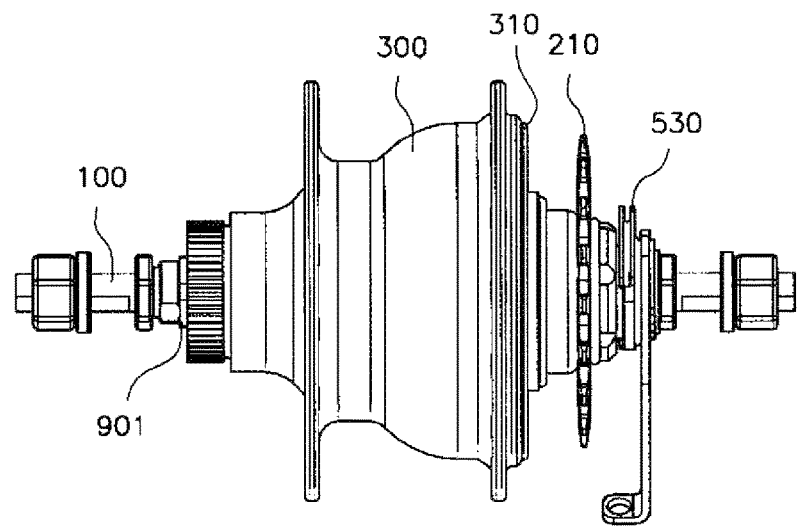
FIG. 2 is a front view showing the hub-embedded multi-stage transmission according to the present invention.

FIG. 1 is a perspective view showing a hub-embedded multi-stage transmission according to the present invention, and FIG. 2 is a front view showing the hub-embedded multi-stage transmission according to the present invention.

Figure 3:
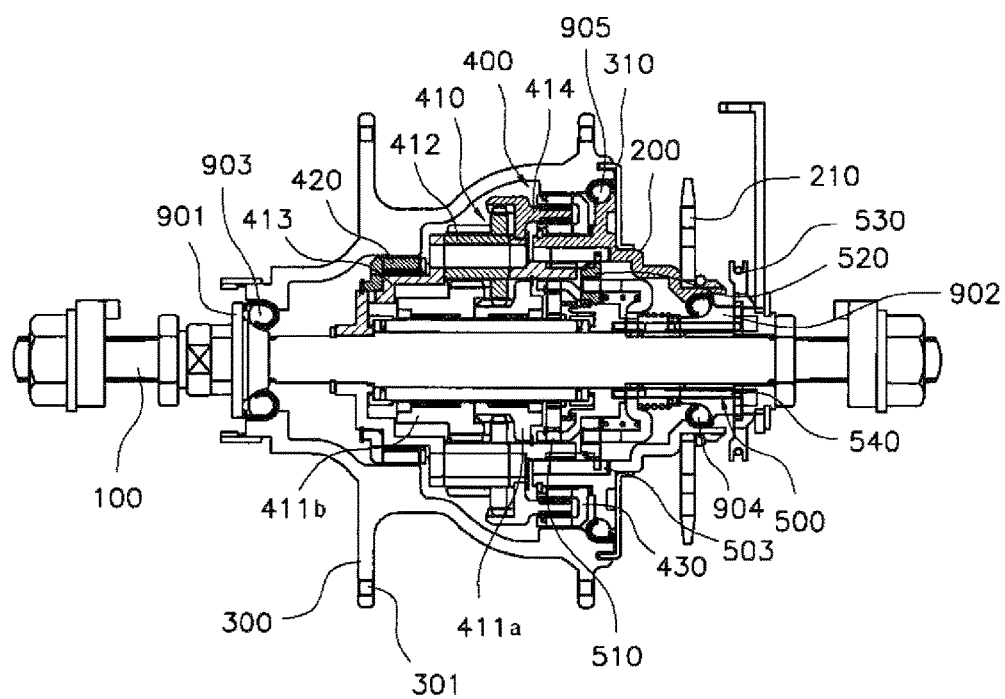
FIG. 3 is a front sectional view showing a state where an axial pawl control member has been moved to the left side in an embodiment of the hub-embedded multi-stage transmission according to the present invention.
Figure 4:
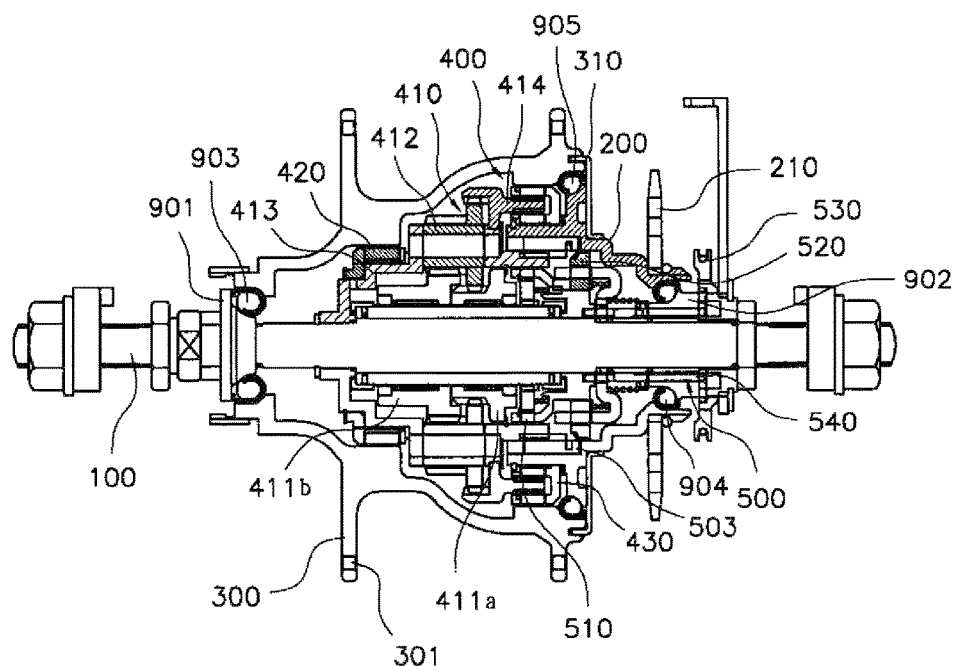
FIG. 4 is a front sectional view showing a state where the axial pawl control member has been moved to the right side in an embodiment of the hub-embedded multi-stage transmission according to the present invention.

FIG. 3 is a front sectional view showing as a state where an axial pawl control member has been moved to the left side in an embodiment of the hub-embedded multi-stage transmission according to the present invention, and FIG. 4 is a front sectional view showing a state where the axial pawl control member has been moved to the right side in an embodiment of the hub-embedded multi-stage transmission according to the present invention.

Figure 5:
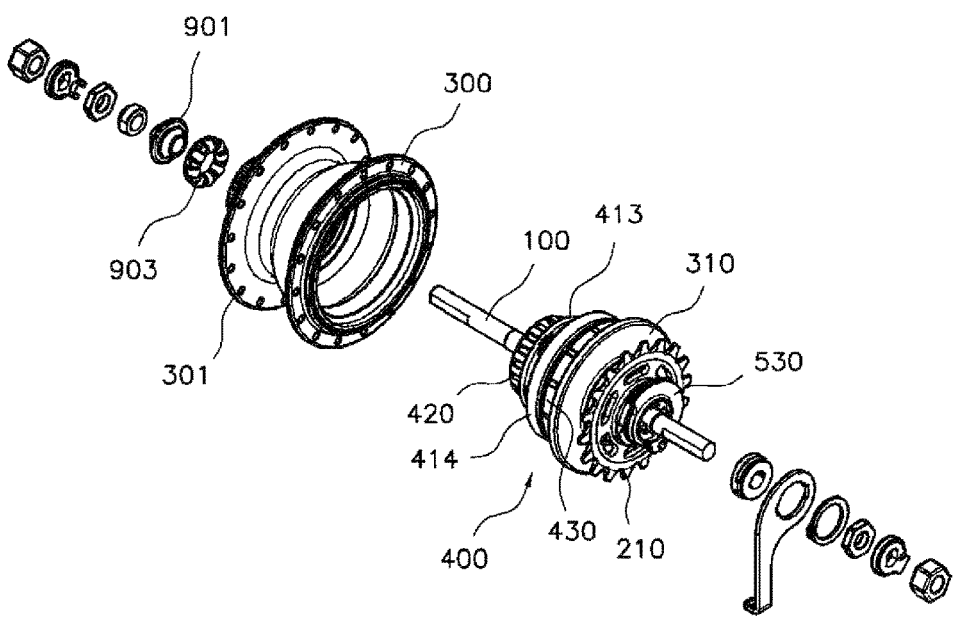
FIG. 5 is an exploded perspective view showing an embodiment of the hub-embedded multi-stage transmission according to the present invention, wherein the hub-embedded multi-stage transmission is partially disassembled to show the interior of a hub shell.
Figure 6:
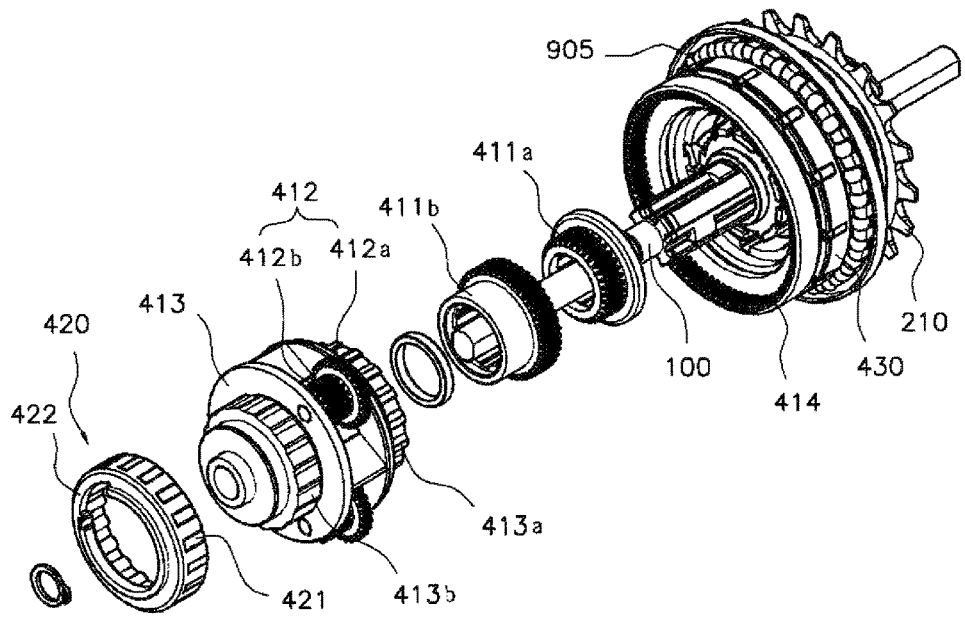
FIG. 6 is an exploded perspective view showing a planetary gear set disassembled in an embodiment of the hub-embedded multi-stage transmission according to the present invention.
Figure 7:
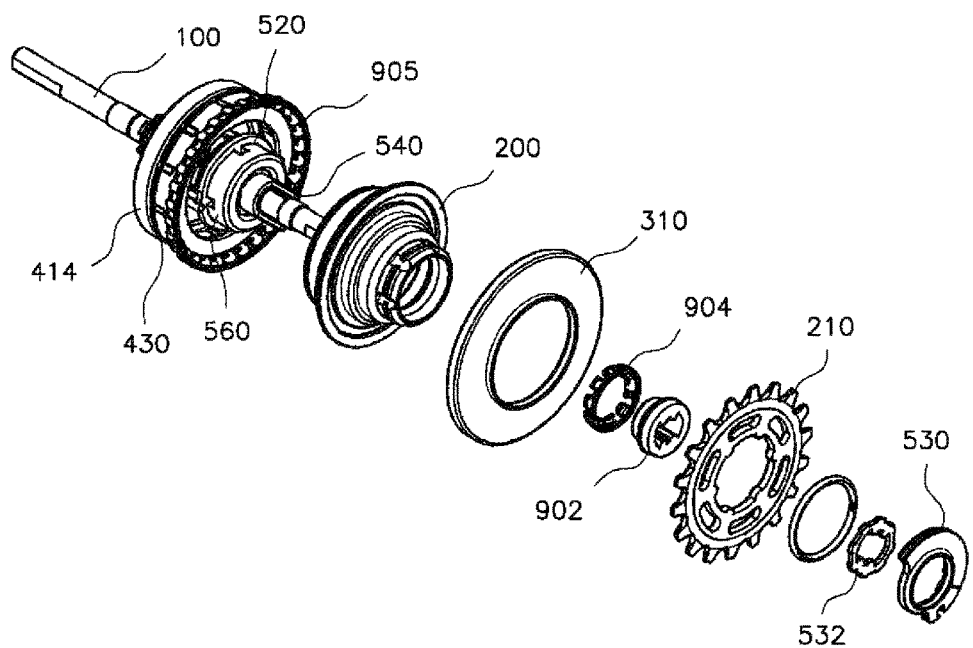
FIG. 7 is an exploded perspective view showing a driver disassembled in an embodiment of the hub-embedded multi-stage transmission according to the present invention.

Further, FIG. 5 is an exploded perspective view showing an embodiment of the hub-embedded multi-stage transmission according to the present invention, wherein the hub-embedded multi-stage transmission is partially disassembled to show the interior of a hub shell, FIG. 6 is an exploded perspective view showing a planetary gear set disassembled in an embodiment of the hub-embedded multi-stage transmission according to the present invention, and FIG. 7 is an exploded perspective view showing a driver disassembled in an embodiment of the hub-embedded multi-stage transmission according to the present invention.

Figure 8:
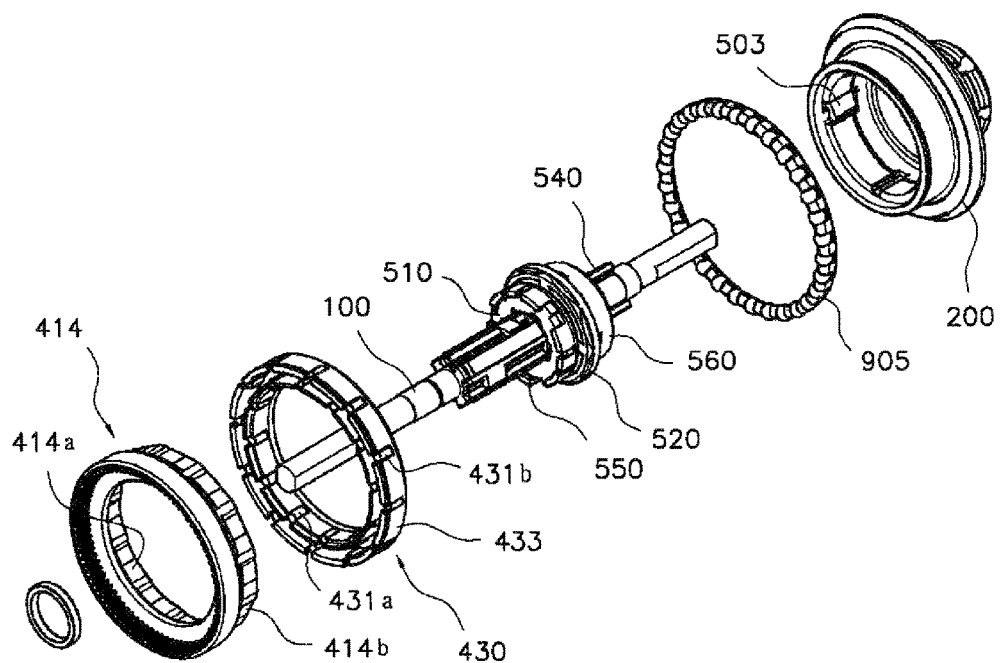
FIG. 8 is an exploded perspective view showing a second output clutch disassembled in an embodiment of the hub-embedded multi-stage transmission according to the present invention.
Figure 9:
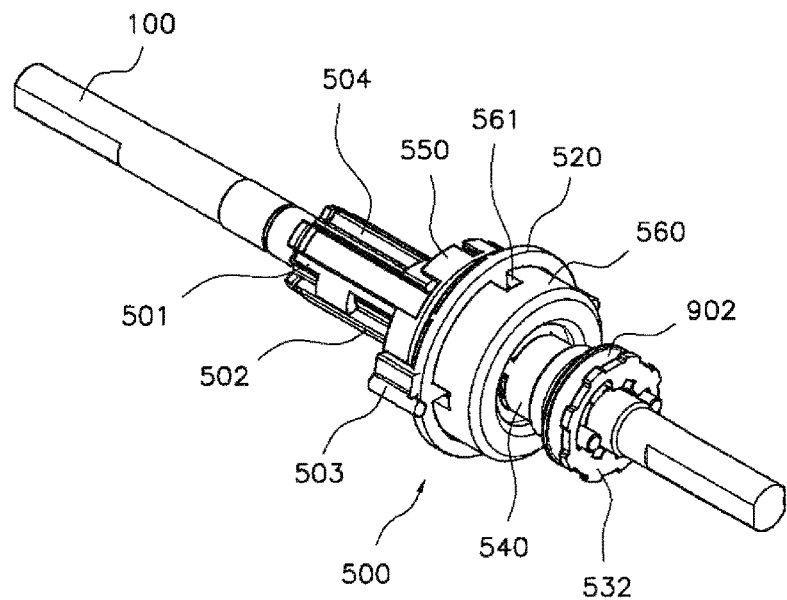
FIGS. 9 and 10 are perspective views showing a control unit in an embodiment of the hub-embedded multi-stage transmission according to the present invention.
Figure 10:
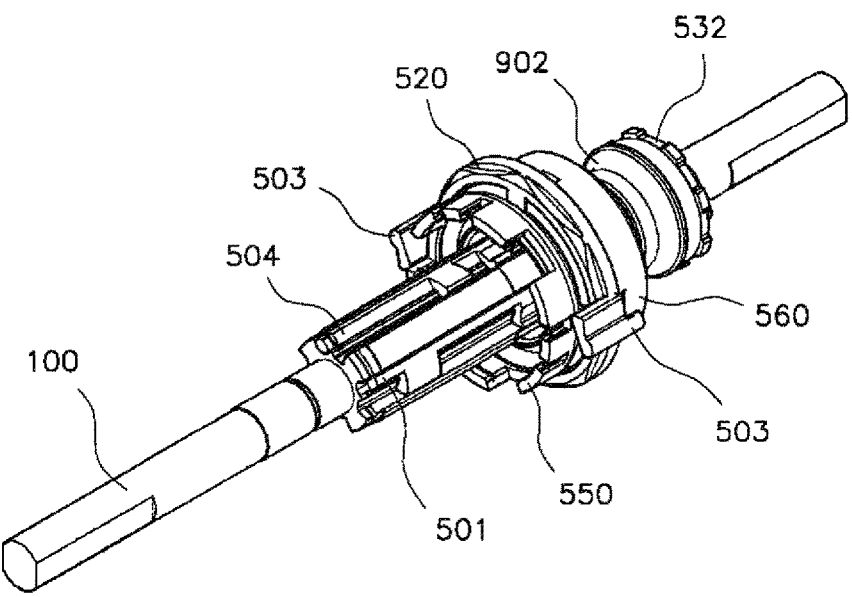

Moreover, FIG. 8 is an exploded perspective view showing a second output clutch disassembled in an embodiment of the hub-embedded multi-stage transmission according to the present invention, and FIGS. 9 and 10 are perspective views showing a control unit in an embodiment of the hub-embedded multi-stage transmission according to the present invention, wherein FIG. 9 is a perspective view when viewed from the right side, whereas FIG. 10 is a perspective view when viewed from the left side.

Figure 11:
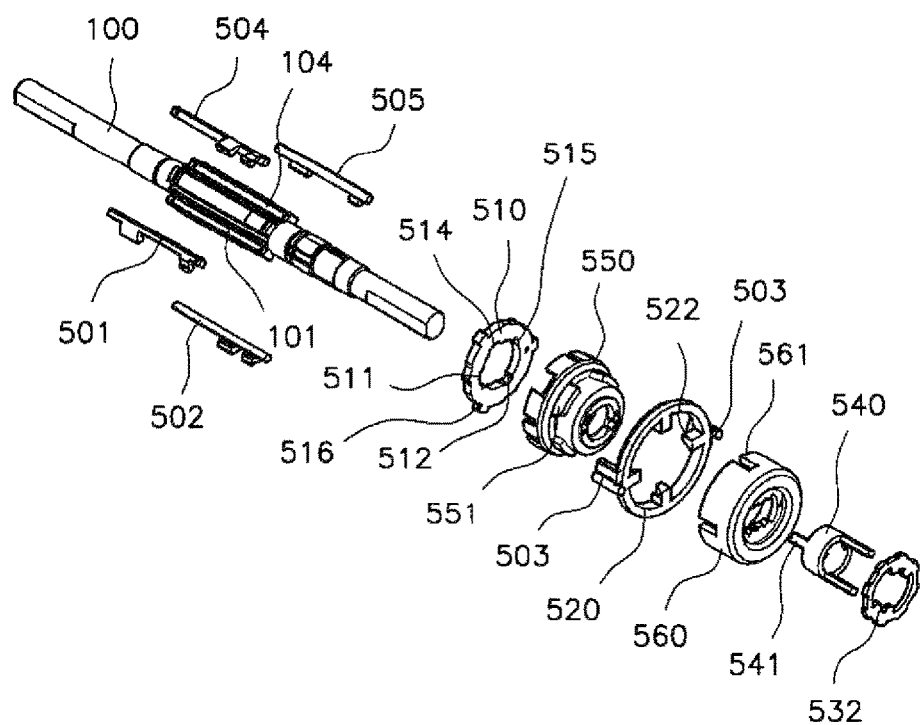
FIG. 11 is an exploded perspective view showing the control unit disassembled in an embodiment of the hub-embedded multi-stage transmission according to the present invention.
Figure 12:
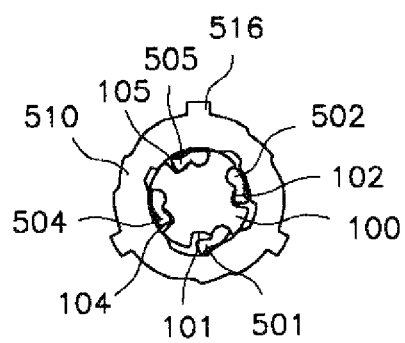
FIG. 12 is a right side view showing pawls controlled depending on the rotation of a circumferential pawl control member in an embodiment of the hub-embedded multi-stage transmission according to the present invention.
Figure 12:
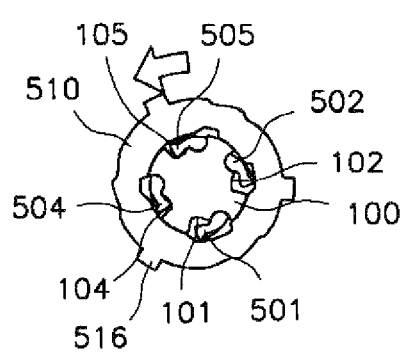
Figure 12:
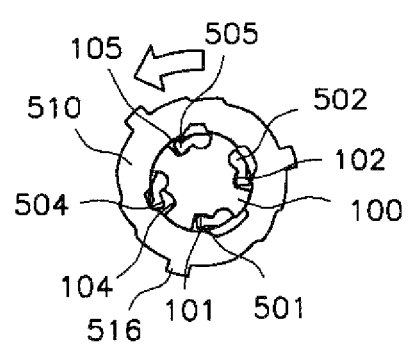
Figure 12:
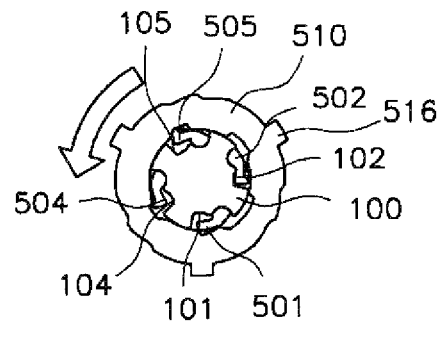

Furthermore, FIG. 11 is an exploded perspective view showing the control unit disassembled in an embodiment of the hub-embedded multi-stage transmission according to the present invention, and FIG. 12 is a right side view showing pawls controlled depending on the rotation of a circumferential pawl control member in an embodiment of the hub-embedded multi-stage transmission according to the present invention, wherein FIGS. 12 (*a*), 12 (*b*), 12 (*c*), and 12 (*d*) represent first, second, fourth and fifth stages, respectively.

Figure 13:
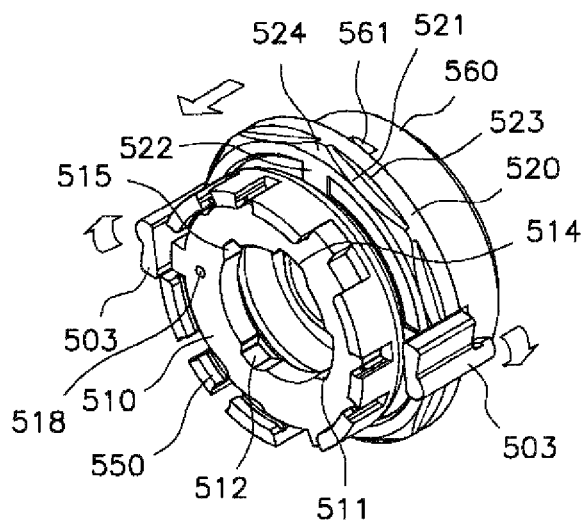
FIG. 13 is a view showing a state where the pawls provided on an inner peripheral surface of the driver are laid down in an embodiment of the hub-embedded multi-stage transmission according to the present invention.
Figure 13:
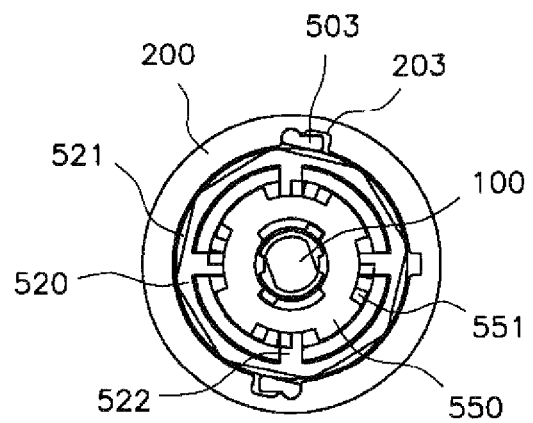

Further, FIG. 13 is a view showing a state where the pawls provided on an inner peripheral surface of the driver are laid down in an embodiment of the hub-embedded multi-stage transmission according to the present invention, wherein FIGS. 13 (*a*) and 13 (*b*) represent a perspective view and a right side view, respectively.

Figure 14:
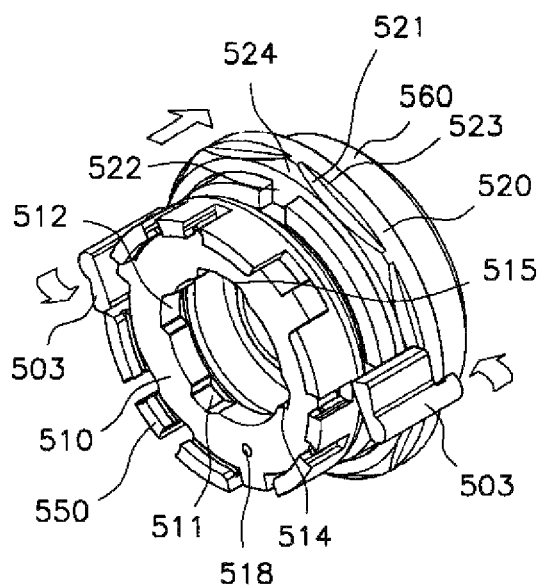
FIG. 14 is a view showing a state where the pawls provided on the inner peripheral surface of the driver are erected in an embodiment of the hub-embedded multi-stage transmission according to the present invention.
Figure 14:
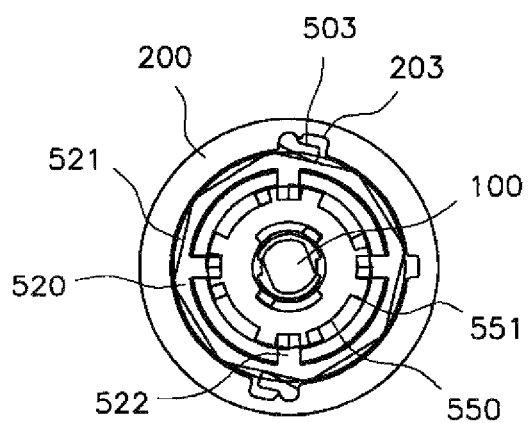

Similarly, FIG. 14 is a view showing a state where the pawls provided on the inner peripheral surface of the driver are erected in an embodiment of the hub-embedded multi-stage transmission according to the present invention, wherein FIGS. 14 (*a*) and 14 (*b*) represent a perspective view and a right side view, respectively.

Figure 15:
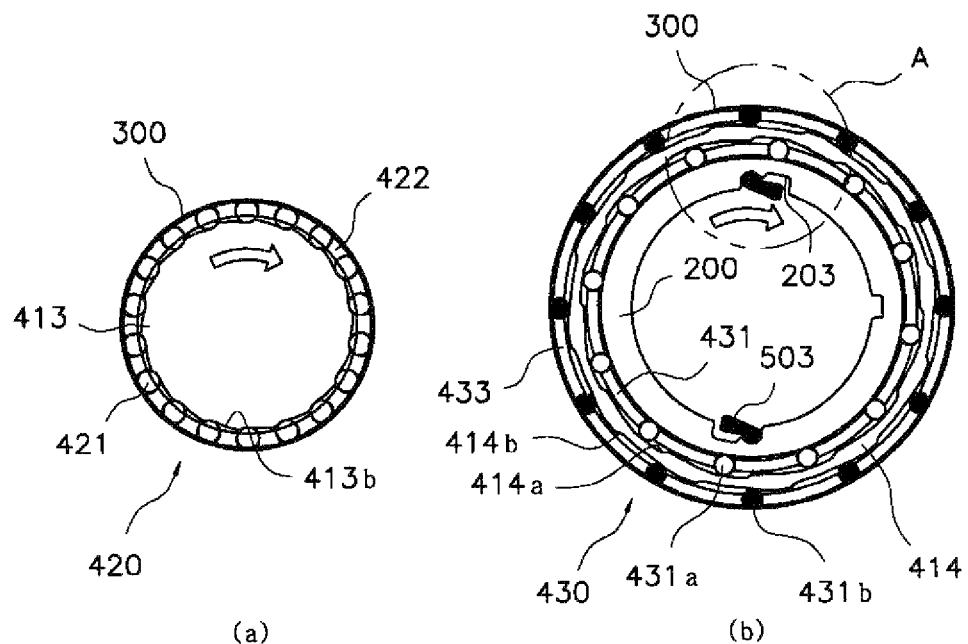
FIG. 15 is a view showing first and second output clutches in an embodiment of the hub-embedded multi-stage transmission according to the present invention.
Figure 15:
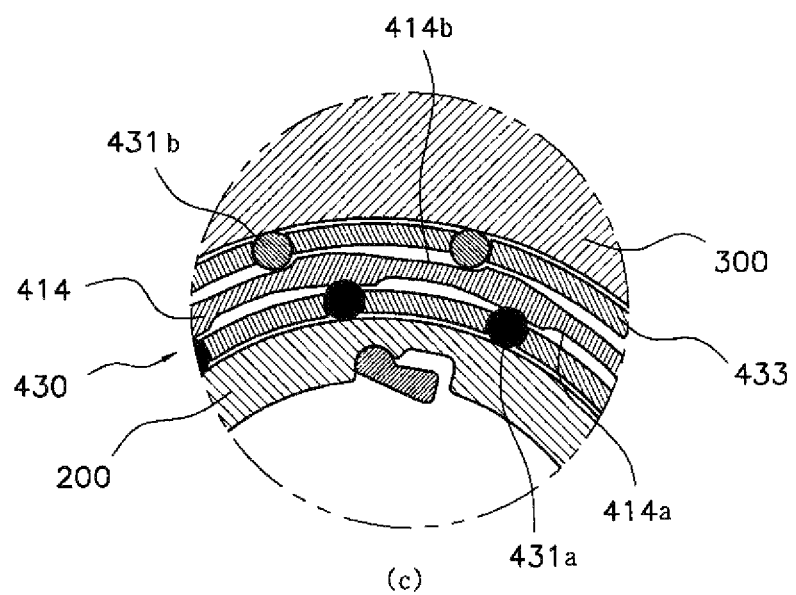

Moreover, FIG. 15 is a view showing first and second output clutches in an embodiment of the hub-embedded multi-stage transmission according to the present invention, wherein FIG. 15 (*a*) represents the first output clutch, whereas FIGS. 15 (*b*) and 15 (*c*) represent the second output clutch.

Figure 16:
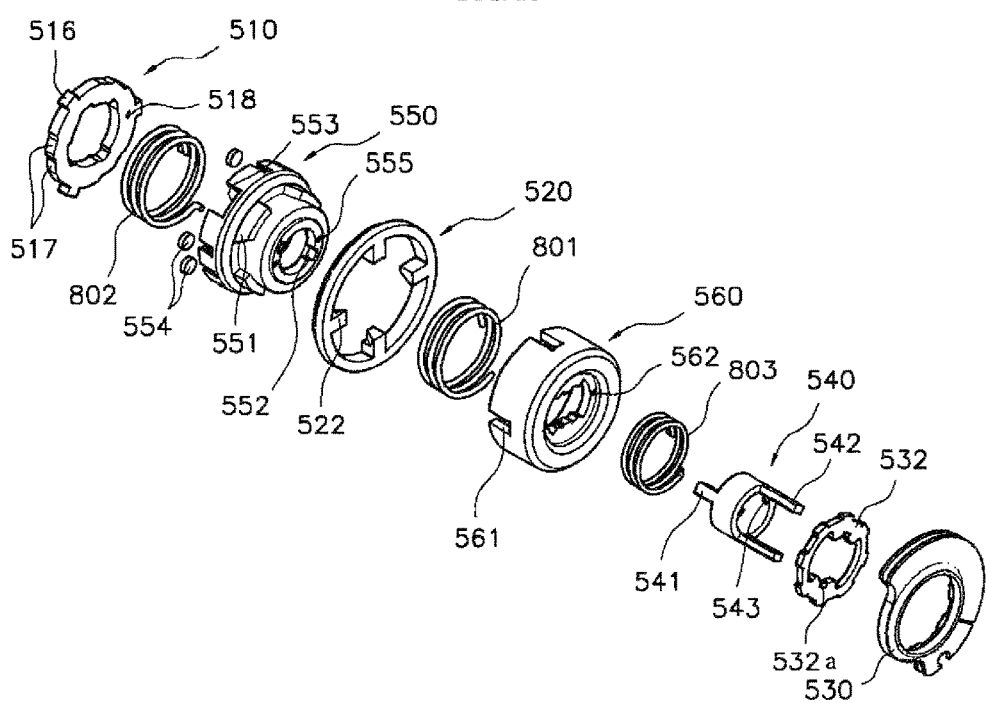
FIG. 16 is an exploded perspective view showing a main part of the control unit in an embodiment of the hub-embedded multi-stage transmission according to the present invention.
Figure 17:
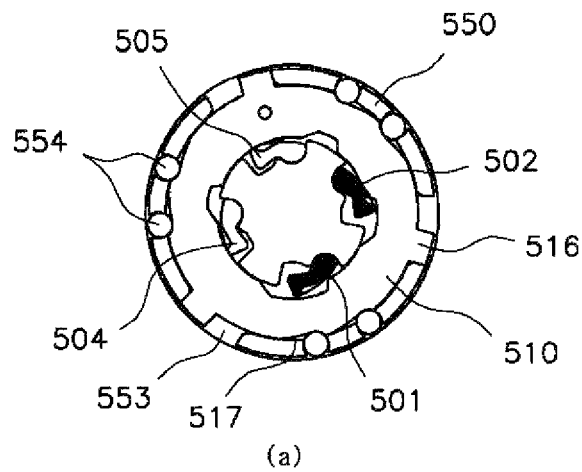
FIG. 17 is a view showing a circumferential forced shift function in an embodiment of the hub-embedded multi-stage transmission according to the present invention.
Figure 17:
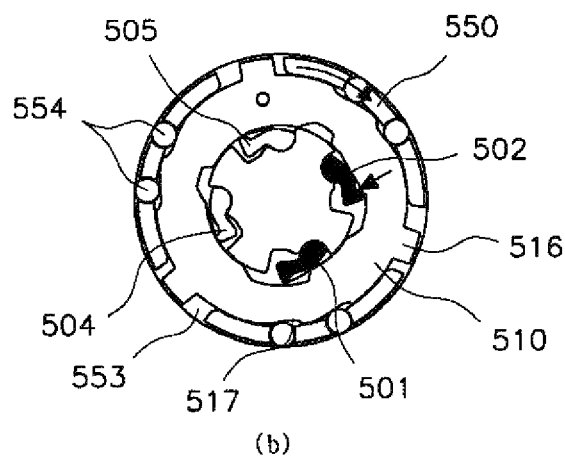
Figure 17:
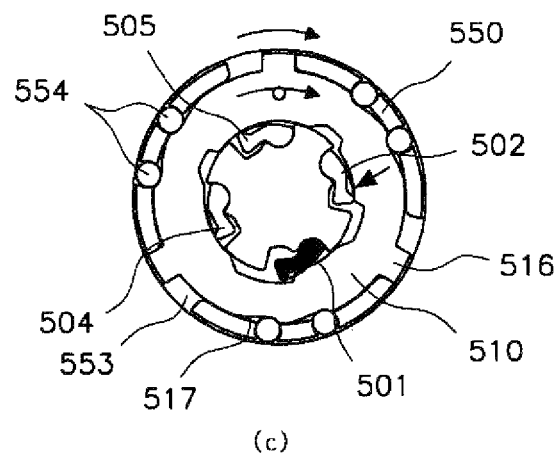

Furthermore, FIG. 16 is an exploded perspective view showing a main part of the control unit in an embodiment of the hub-embedded multi-stage transmission according to the present invention, and FIG. 17 is a view showing a circumferential forced shift function in an embodiment of the hub-embedded multi-stage transmission according to the present invention, wherein FIG. 17 (*a*) shows a second stage, FIG. 17 (*b*) shows a state where a difference in phase angle between an angle control member 550 and a circumferential pawl control member 510 is produced due to strong engagement of a second pawl 502 with inner teeth of a first sun gear 411*a* in spite of manipulation of a shift lever to a first stage, and FIG. 17 (*c*) is a view showing a state where shifting to the first stage has been achieved by the circumferential forced shift function.

Figure 18:
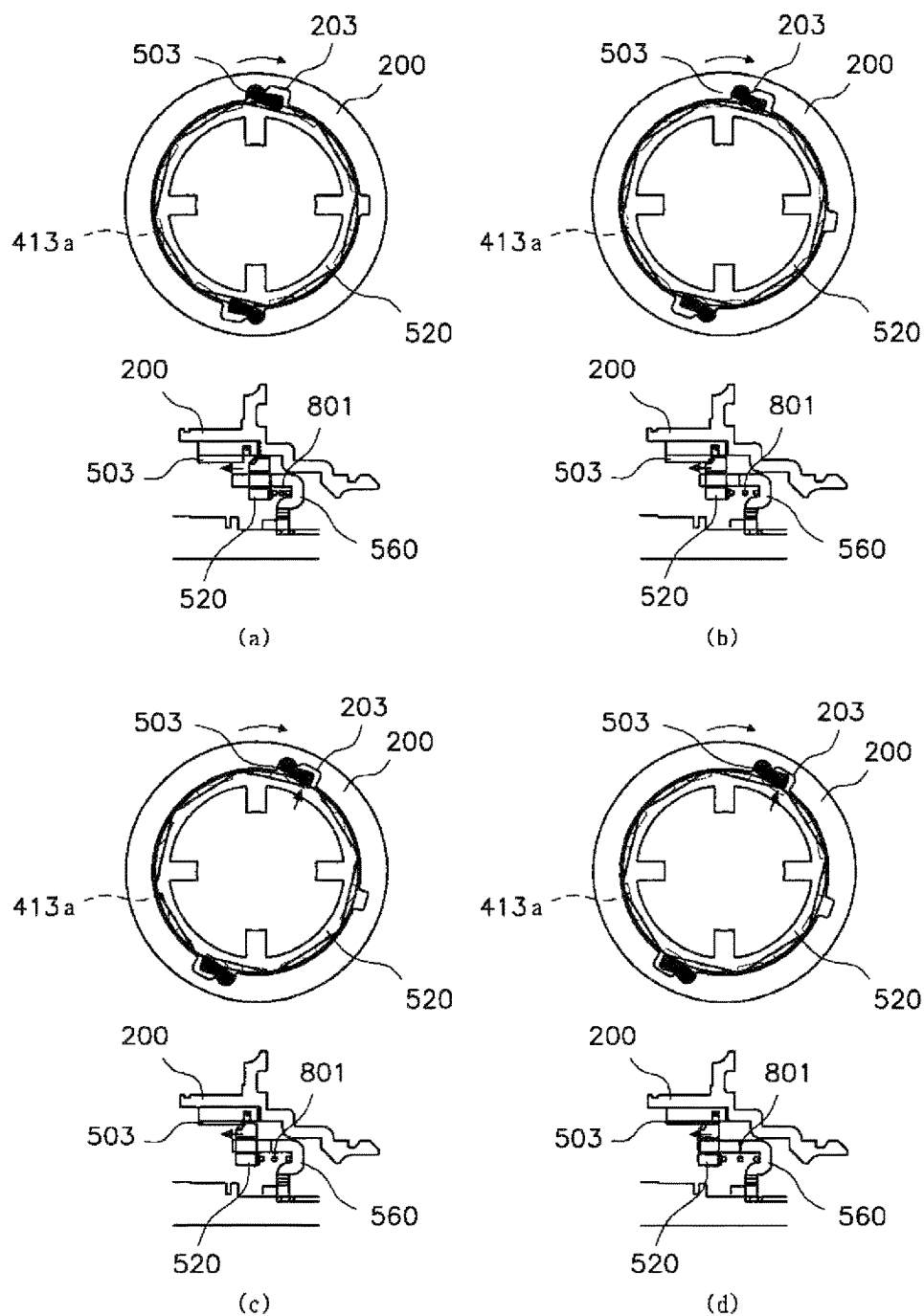
FIG. 18 is a view showing an axial forced shift function in an embodiment of the hub-embedded multi-stage transmission according to the present invention.

Further, FIG. 18 is a view showing an axial forced shift function in an embodiment of the hub-embedded multi-stage transmission according to the present invention, wherein FIG. 18 (*a*) represents a state where an axial pawl control member 520 is moved to the right side so that third pawls 503 are completely erected, and FIG. 18 (*d*) represents a state where the axial pawl control member 520 is completely moved to the left side so that the third pawls 503 are completely laid down.

Figure 19:
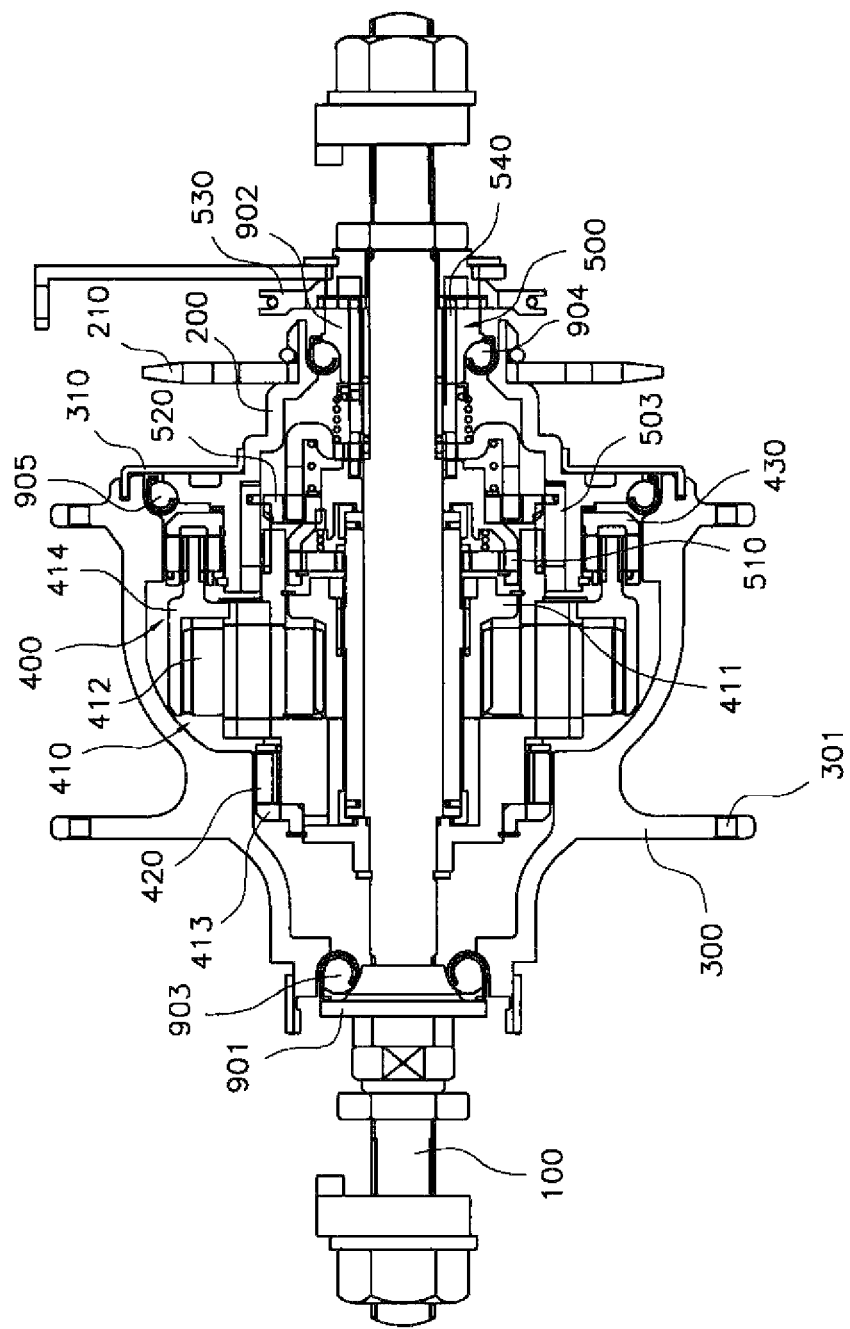
FIGS. 19 and 20 are front sectional views showing different embodiments of the hub-embedded multi-stage transmission according to the present invention.
Figure 20:
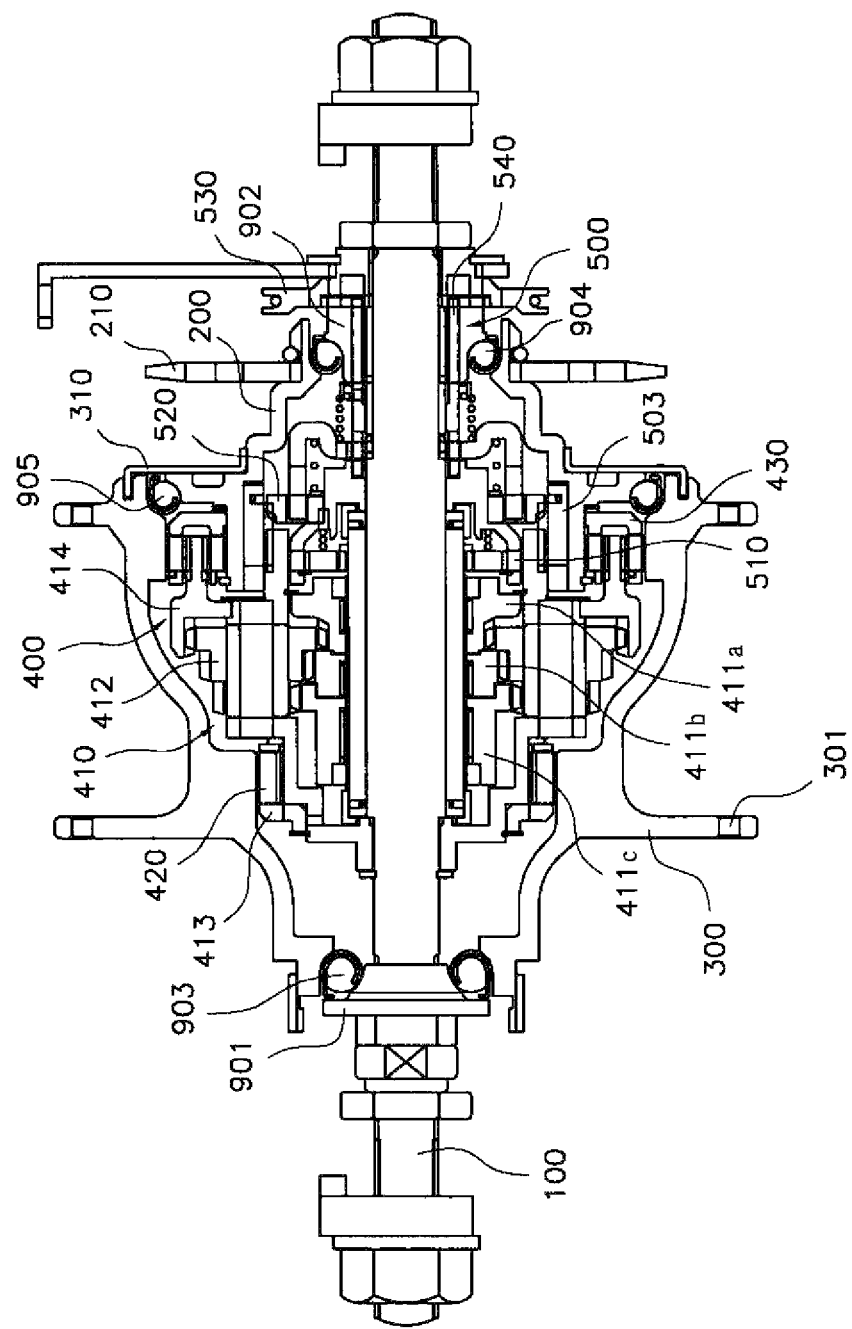

Finally, FIGS. 19 and 20 are front sectional views showing different embodiments of the hub-embedded multi-stage transmission according to the present invention, wherein FIG. 19 represents an embodiment employing a one-stage planetary gear set and FIG. 20 represents an embodiment employing a three-stage planetary gear set.

With the technical features of the hub-embedded multi-stage transmission of the present invention, there is provided a compact hub-embedded multi-stage transmission that is implemented to achieve multi-stage shifting by using a multi-stage planetary gear set having a one stage or two or more stages and a double one-way clutch in order to impart an overrunning function during inertial travel, and at the same time, to allow rapid shifting to be made even with a small force for manipulating a shift lever by means of use of a forced shift function even in a driven travel state, thereby considerably improving shifting accuracy.

Embodiments of the present invention will be described below in detail with reference to the accompanying drawings.

The hub-embedded multi-stage transmission of the present invention includes a shaft 100 fixed to a vehicle body, a driver 200 for receiving a rotational force and a hub shell 300 for outputting the rotational force, wherein the driver and the hub shell are rotatably located on an outer periphery of the shaft 100; a shifting unit 400 for changing the rotational force input from the driver 200 and outputting the changed rotational force to the hub shell 300, wherein the shifting unit 400 includes a planetary gear set 410 composed of a sun gear, a planetary gear 412, a carrier 413 and a ring gear 414 provided within the hub shell 300, a first output clutch 420 provided as a one-way clutch between the carrier 413 and the hub shell 300, and a second output clutch 430 provided as two one-way clutches integrally formed with each other to have a certain difference in phase angle and positioned between the driver 200 and the ring gear 414 and between the ring gear 414 and the hub shell 300, respectively, whereby the rotational force of the driver 200 is transferred to the ring gear 414 or the rotational force of the ring gear 414 is transferred to the hub shell 300 depending on a difference in rotational speed; and a control unit 500 for controlling shifting of the shifting unit 400, wherein the control unit 500 includes a circumferential pawl control member 510 circumferentially rotatable to control a plurality of pawls, which are located in pawl seating portions formed on an outer peripheral surface of the shaft 100, depending on manipulation of a shift lever, thereby selectively restricting the rotation of the sun gear, and an axial pawl control member 520 axially movable to control pawls, which are provided on an inner peripheral surface of the driver 200, depending on the manipulation of the shift lever, thereby selectively transferring the rotation of the driver 200 to the carrier 413.

The hub-embedded multi-stage transmission of the present invention roughly includes the shaft 100, the driver 200, the hub shell 300, the shifting unit 400 and the control unit 500, as shown in FIGS. 1 to 4.

First, the shaft 100 has both ends fixedly and non-rotatably supported, with a fastening means such as a fastening nut, by the body of a scooter, a bicycle, a rickshaw or the like (hereinafter, referred to as a "traveling apparatus") that requires shifting.

The shaft 100 is configured to have different diameters at respective portions thereof, as shown in FIG. 11. In particular, on an outer peripheral surface of a middle portion of the shaft 100, a plurality of pawl seating portions are concavely formed with a certain difference in phase angle so that the pawls as will be described later can be placed in the respective pawl seating portions.

This shaft 100 constructs the backbone of the present invention, and all components described later are rotatably or non-rotatably provided on the outer periphery of the shaft 100.

Next, the driver 200 allows the hub-embedded multi-stage transmission of the present invention to receive the rotational force such as man power or an electromotive force from the traveling apparatus and is rotatably provided on one side of the shaft 100.

A cone nut 902 and a bearing 904 coupled to the shaft 100 are provided on an inner peripheral surface of the driver 200 shown on the right side in the figures, so that the driver 200 is supported to be rotatable independent of the shaft 100.

In particular, a sprocket 210 is fixed to the driver 200 to be integrally rotated therewith, so that the sprocket 210 receives a driving force from the outside, for example, through a power transfer means such as a chain, to integrally rotate the driver 200.

Moreover, the hub shell 300 is positioned on the outermost side of the shaft 100 and configured to output a shifted driven force to wheels or the like of the traveling apparatus.

The hub shell 300 has a generally cylindrical shape. An outer periphery of the hub shell 300 may be provided with a plurality of holes 301 to which spokes of a wheel may be connected, and various components can be inserted and assembled into the hub shell 300.

Here, a cone nut 901 and a bearing 903 coupled to the shaft 100 is provided on an inner peripheral surface of the hub shell 300 shown on the left side in the figures, so that the hub shell 300 is supported to be rotatable independent of the shaft 100.

Next, the shifting unit 400 is positioned within the hub shell 300 to change the rotational force input through the driver 200 in multiple stages and to output the changed rotational force through the hub shell 300. The shifting unit 400 includes the planetary gear set 410, the first output clutch 420 and the second output clutch 430.

According to the present invention, shifting is substantially achieved by the planetary gear set 410, and then the changed rotational force is output through the first output clutch 420 or the second output clutch 430 to the hub shell 300.

The planetary gear set 410 is composed of a sun gear, a planetary gear 412, a carrier 413 and a ring gear 414. The planetary gear 412 is rotatably supported by the carrier 413. The sun gear is positioned within the carrier 413 so that the sun gear is engaged with portions of the planetary gear 412 which are located on the inward side. The ring gear 414 is provided outwards with respect to the carrier 413 so that the ring gear 414 is engaged with portions of the planetary gear 412 which are located on the outward side.

Accordingly, the rotational force is input from the ring gear 414 or the carrier 413 and then output through the planetary gear 412 to the carrier 413 or the ring gear 414, thereby achieving shifting such as acceleration or deceleration.

For example, if the rotational force is input from the ring gear 414 and then output through the planetary gear 412 to the carrier 413, deceleration is achieved. On the contrary, if the rotational force is input from the carrier 413 and then output through the planetary gear 412 to the ring gear 414, acceleration is achieved.

Accordingly, acceleration or deceleration may be achieved in the planetary gear set 410 depending on the transfer route of the rotational force and whether or not the sun gear may be rotated.

The control of the pawls which determines whether or not the sun gear may be rotated will be described later in detail in connection with the control, unit 500.

Next, the first output clutch 420 provided in the shifting unit 400 is positioned between an outer peripheral surface of the carrier 413 of the planetary gear set 410 and the inner peripheral surface of the hub shell 300, thereby serving to output a rotational force for deceleration or a rotational force via direct coupling.

The first output clutch 420 is a one-way clutch that transfers the rotational force only in one direction and is composed of unidirectionally inclined recesses 413b formed on the outer peripheral surface of the carrier 413 and a cage 422 for rotatably supporting a plurality of rollers 421 to be positioned within the unidirectionally inclined recesses 413b, as shown in FIGS. 6 and 15 (a).

If the rotational speed of the carrier 413 positioned inwards with respect to the first output clutch 420 is faster than that of the hub shell 300 positioned outwards with, respect to the first output clutch 420, the rollers 421 are engaged between the unidirectionally inclined recesses 413b formed on the outer peripheral surface of the carrier 413 and the inner peripheral surface of the hub shell 300, so that the rotational force of the carrier 413 positioned inwards with respect to the first output clutch 420 can be transferred to the hub shell 300 positioned outwards with respect to the first output clutch 420.

On the contrary, if the rotational speed of the carrier 413 positioned inwards with respect to the first output clutch 420 is slower than that of the hub shell 300 positioned outwards with respect to the first output clutch 420, the rollers 421 are simply positioned within the unidirectionally inclined recesses 413b, so that the rotational force of the carrier 413 positioned inwards with respect to the first output clutch 420 cannot be transferred to the hub shell 300 positioned outwards with respect to the first output clutch 420.

The second output clutch 430 provided in the shifting unit 400 is composed of two one-way clutches that are integrally formed with each other and as shown in FIGS. 8, 15 (b) and 15 (c), are provided between an outer peripheral surface of the driver 200 and the inner peripheral surface of the hub shell 300 such that the ring gear 414 is positioned between the two one-way clutches, so that the second output clutch 430 serves to simply transfer the rotational force or to output a rotational force for acceleration.

That is, the second output clutch 430 having the two one-way clutches, which are positioned between the outer peripheral surface of the driver 200 and an inner peripheral surface of the ring gear 414 and between an outer peripheral surface of the ring gear 414 and the inner peripheral surface of the hub shell 300, respectively, and are integrally formed with each other to have a certain difference in phase angle, transfers the rotational force of the driver 200 to the ring gear 414 or the rotational force of the ring gear 414 to the hub shell 300, depending on the difference in rotational speed.

In other words, when the second output clutch 430 transfers the rotational force of the driver 200 to the ring gear 414, the certain difference in phase angle between the two one-way clutches causes the rotational force of the driver 200 not to be output to the hub shell 300. On the contrary, when the second output clutch 430 transfers the rotational force of the ring gear 414 to the hub shell 300, the rotational force of the ring gear 414 is not transferred to the driver 200.

Accordingly, the final rotational force for deceleration or rotational force via direct coupling in the shifting unit 400 is output from the carrier 413 through the first output clutch 420 to the hub shell 300, while the rotational force for acceleration is output from the ring gear 414 through the second output clutch 430 to the hub shell 300.

Finally, the control unit 500 for controlling shifting of the shifting unit 400 roughly includes a circumferential pawl control member 510 and an axial pawl control member 520.

The circumferential pawl control member 510 is circumferentially rotated to control the plurality of pawls provided on the outer peripheral surface of the shaft 100 depending on the manipulation of the shift lever, thereby selectively restricting the rotation of the sun gear.

In addition, the axial pawl control member 520 is axially moved to control the pawls provided on the inner peripheral surface of the driver 200 depending on the manipulation of the shift lever, thereby selectively establishing the direct coupling of the rotation of the driver 200 to the carrier 413.

As described above in detail, the circumferential pawl control member 510 controls the pawls provided in the pawl seating portions of the shaft 100 while the axial pawl control member 520 controls the pawls provided on the inner peripheral surface of the driver 200 depending on the operator's manipulation of the shift lever, thereby changing the transfer route of the rotational force to achieve shifting in the planetary gear set 410 and then outputting only a rotational force, which has been changed for faster rotation, through the first output clutch 420 or the second output clutch 430 to the hub shell 300.

In particular, as shown in FIGS. 8, 15 (b) and 15 (c), the second output clutch 430 according to the present invention preferably has unidirectionally inclined recesses 414a and 414b formed to have a certain difference in phase angle on the inner and outer peripheral surfaces of the ring gear 414; and a cage 433 for rotationally supporting a plurality of rollers 431a and 431b to be located within the unidirectionally inclined recesses 414a and 414b, wherein the rollers 431a located on an inner periphery of the cage 433 and the rollers 431b located on an outer periphery of the cage 433 are integrally formed with the cage 433 to maintain a certain difference in phase angle, whereby the second output clutch 430 is composed of a double one-way clutch having an inner side one-way clutch formed between the outer peripheral surface of the driver 200 and the inner peripheral surface of the ring gear 414 and an outer side one-way clutch formed between the outer peripheral surface of the ring gear 414 and the inner peripheral surface of the hub shell 300.

If the clockwise rotational speed of the driver 200 positioned inwards with respect to the inner side one-way clutch of the second output clutch 430 is faster than that of the ring gear 414 positioned outwards with respect to the inner side one-way clutch, the rollers 431a provided on the inner periphery of the cage 433 are engaged between the outer peripheral surface of the driver 200 and the unidirectionally inclined recesses 414a formed on the inner peripheral surface of the ring gear 414 as shown in black in FIG. 15 (c), so that the inner side one-way clutch of the second output clutch 430 may cause the rotational force of the driver 200 positioned inwards with respect to the inner side one-way clutch to be transferred to the ring gear 414 positioned outwards with respect to the inner side one-way clutch.

Accordingly, the cage 433 is also rotated clockwise. In this case, the cage 433 maintains the certain difference in phase angle between the rollers 431a provided on the inner periphery of the cage 433 and the rollers 431b provided on the outer periphery of the cage 433.

As a result, the rollers 431b provided on the outer periphery of the cage 433 are positioned within the unidirectionally inclined recesses 414b formed on the outer peripheral surface of the ring gear 414, so that the outer side one-way clutch of the second output clutch 430 causes the rotational force of the ring gear 414 not to be transferred to the hub shell 300.

However, if the rotational speed of the ring gear 414 is faster than the clockwise rotational speed of the driver 200, the rollers 431a provided on the inner periphery of the cage 433 are positioned within the unidirectionally inclined recesses 414a formed on the inner peripheral surface of the ring gear 414, so that the inner side one-way clutch of the second output clutch 430 cannot transfer the rotational force to the driver 200.

On the contrary, the rollers 431b provided on the outer periphery of the cage 433 are engaged between the unidirectionally inclined recesses 414b formed on the outer peripheral surface of the ring gear 414 and the inner peripheral surface of the hub shell 300 as shown in black in FIG. 15 (b), so that the outer side one-way clutch of the second output clutch 430 causes the rotational force of the ring gear 414 positioned inwards with respect to the outer side one-way clutch to be transferred to the hub shell 300 positioned outwards with respect to the outer side one-way clutch.

That is, in case of a deceleration condition where the rotation of the ring gear 414 is slower than the rotation of the driver 200 depending on the selective engagement of a gear train, the inner side one-way clutch of the second output clutch 430 causes the rotational force of the driver 200 to be transferred to the ring gear 414, whereas the certain difference in phase angle between the inner side one-way clutch and the outer side one-way clutch prevents the rotational force of the ring gear 414 from being output to the hub shell 300, as shown in FIG. 15(c).

However, in case of, an acceleration condition where the rotation of the ring gear 414 is faster than the rotation of the driver 200, the inner side one-way clutch of the second output clutch 430 causes the ring gear 414 to be overrun with respect to the driver 200, whereas the outer side one-way clutch of the second output clutch 430 causes the rotation of the ring gear 414 to be output to the hub shell 300, as shown in FIG. 15 (b).

In addition, if the inertial travel causes the rotational speed of the hub shell 300 to be faster than the rotational speed of the ring gear 414, the second output clutch 430 causes the rotational force of the hub shell 300 not to be transferred to the ring gear 414 or the driver 200.

In particular, the planetary gear 412 in the present invention is composed of a one-stage planetary gear or a multi-stage planetary gear having two or more stages, and the pawls and the sun gear are further configured depending on the number of stages of the planetary gear, so that an output can be obtained with the number of shift stages of "(2×the number of stages of the planetary gear)+1".

That is, the planetary gear 412 provided in the planetary gear set 410 may be composed of a one-stage planetary gear 412 formed with only one diameter as shown in FIG. 19, a two-stage planetary gear 412 having a larger-diameter portion 412a and a smaller-diameter portion 412b as shown in FIGS. 3 to 18, or a three-stage planetary gear 412 formed with three diameters as shown in FIG. 20. Although not shown in the figures, it is also possible to employ a planetary gear having four or more stages.

For example, if the one-stage planetary gear 412 is employed as shown in FIG. 19, two pawls are provided in the pawl seating portions of the shaft 100 and only one sun gear 411 is provided, thereby enabling implementation of three-stage shifting ratios of deceleration, direct-coupling and acceleration.

In addition, if the two-stage planetary gear 412 is employed as shown in FIGS. 3 to 18, four pawls are provided in the pawl seating portions of the shaft 100 and two sun gears 411a and 411b are provided corresponding to the larger-diameter portion 412a and the smaller-diameter portion 412b of the planetary gear 412, thereby enabling implementation of total five-stage shifting ratios of two stages of deceleration, direct-coupling and two stages of acceleration.

Of course, if the three-stage planetary gear 412 is employed as shown in FIG. 20, and accordingly, the number of pawls and the number of sun gears 411a, 411b and 411c increase to 6 and 3, respectively, it is also possible to implement the total seven-stage shifting ratios of three stages of deceleration, direct-coupling and three stages of acceleration. Similarly, it is also possible to apply a multi-stage planetary gear having four or more stages.

That is, by applying the multi-stage planetary gear 412 to the planetary gear set 410, it is possible to, obtain different shifting ratios that have multiple stages for acceleration and deceleration, respectively.

Hereinafter, for the convenience of description, the specific configurations and operations of the shifting unit 400 and the control unit 500 will be described with reference to the drawings based on the planetary gear set 410 to which the two-stage planetary gear 412 having the larger-diameter portion 412a and the smaller-diameter portion 412b is applied the operation of an embodiment to which the two-stage planetary gear set 410 is applied. The descriptions of embodiments to which the one-stage planetary gear or the multi-stage planetary gear having three or more stages is applied will be omitted.

Accordingly, as the two-stage planetary gear 412 is employed in one embodiment of the present invention, the sun gear is composed of the first sun gear 411a, which is engaged with the larger-diameter portion 412a of the planetary gear 412, and the second sun gear 411b, which is engaged with the smaller-diameter portion 412b of the planetary gear 412, and there are provided five kinds of pawls such as a first pawl 501, the second pawl 502, the third pawls 503, a fourth pawl 504 and a fifth pawl 505.

The rotation of the first sun gear 411a is selectively restricted by means of the second pawl 502 or fourth pawl 504 depending on the control of the circumferential pawl control member 510, while the rotation of the second sun gear 411b is selectively restricted by means of the first pawl 501 or fifth pawl 505 depending on the control of the circumferential pawl control member 510.

In addition, the carrier 413 is selectively direct-coupled to the driver 200 by means of the third pawls 503 provided on the driver 200 depending on the control of the axial pawl control member 520.

That is, the first pawl 501, the second pawl 502, the fourth pawl 504 and the fifth pawl 505 are positioned within the pawl seating portions 101, 102, 104 and 105 of the shaft 100, and these pawls are configured to be elastically erected by ring springs which are not been shown in the figures.

As shown in FIG. 11, the circumferential pawl control member 510 that has grooves 511, 512, 514 and 515 concavely formed on an inner periphery of the circumferential pawl control member 510 is positioned outwards with respect to the pawls 510, 502, 504 and 505 configured as described above. Accordingly, when the corresponding grooves 511, 512, 514 and 515 are positioned outwards with respect to the pawls 501, 502, 504 and 505 depending on a circumferential rotational angle of the circumferential pawl control member 510, the pawls 501, 502, 504 and 505 are erected. On the contrary, when the grooves 511, 512, 514 and 515 are not positioned outwards with respect to the pawls 501, 502, 504 and 505, the pawls 501, 502, 504 and 505 are laid down so that they are positioned within the pawl seating portions 101, 102, 104 and 105, respectively.

As shown in FIG. 12, each of the grooves 511, 512, 514 and 515 is composed of an inclined surface for suppressing the corresponding pawl when the circumferential pawl control member 510 is rotated clockwise, an inclined surface for suppressing the pawl when the circumferential pawl control member 510 is rotated counterclockwise, and a clearance that allows the pawl to be freely erected by the corresponding ring spring when the pawl passes one of the inclined surfaces of the groove and is then positioned in the groove.

In addition, when the pawls 501, 502, 504 and 505 are erected, the pawls 501, 502, 504 and 505 are engaged with inner teeth of the sun gears 411a and 411b that are positioned outwards with respect to the pawls 501, 502, 504 and 505, so that the rotation of the corresponding sun gears 411a and 411b is restricted and thus the control of shifting is achieved.

Each of the first pawl 501, the second pawl 502, the fourth pawl 504 and the fifth pawl 505 which are controlled by the circumferential pawl control member 510 has a control portion and a catching portion which are protrudingly formed at different intervals. As shown in FIG. 11, the control portions are formed near right ends of the first pawl 501, the second pawl 502, the fourth pawl 504 and the fifth pawl 505 in the figure, and the circumferential pawl control member 510 is positioned outwards with respect to the control portions.

In addition, the catching portions are formed to be spaced apart from these control portions by predetermined distances toward the left side in the figure.

The control portion and the catching portion in each of the second pawl 502 and the fourth pawl 504 are adjacent to each other, whereas the control portion and the catching portion in each of the first pawl 501 and the fifth pawl 505 are formed to be slightly spaced apart from each other as compared with the second pawl 502 and the fourth pawl 504.

Here, the first sun gear 411a is positioned outwards with respect to the catching portions of the second pawl 502 and the fourth pawl 504 and adjacent to the circumferential pawl control member 510. On the contrary, the second sun gear 411b is positioned outwards with respect to the catching portions of the first pawl 501 and the fifth pawl 505 and slightly spaced apart from the circumferential pawl control member 510.

That is the first pawl 501 and the fifth pawl 505 have an identical shape and are positioned within the pawl seating portions 101 and 105 of the shaft 100 so as to face each other, and the second pawl 502 and the fourth pawl 504 have an identical shape and are positioned within the pawl seating portions 102 and 104 of the shaft 100 so as to face each other.

Thus, the circumferential pawl control member 510 is positioned outwards with respect to the control portions formed in the respective pawls 501, 502, 504 and 505, and the first sun gear 411a and the second sun gear 411b are positioned outwards with respect to the catching portions formed in the respective pawls 501, 502, 504 and 505, respectively.

Accordingly, when the control portions of the pawls 501, 502, 504 and 505 that tend to be elastically erected depending on the rotation angle of the circumferential pawl control member 510 are positioned within the grooves 511, 512, 514 and 515, the catching portions of the corresponding pawls 501, 502, 504 and 505 are erected and then engaged with the inner teeth formed on inner peripheral surfaces of the sun gears 411a and 411b, thereby restricting the rotation of the corresponding sun gears 411a and 411b.

The aforementioned first pawl 501, second pawl 502, fourth pawl 504 and fifth pawl 505 are respectively positioned one, by one on the outer peripheral surface of the shaft 100, while the two third pawls 503 are positioned within pawl seating portions 203 formed on the inner peripheral surface of the driver 200 as shown in FIGS. 13 and 14. These third pawls 503 are also configured to be elastically erected by means of ring springs that are not shown in the figures.

These third pawls 503 are configured to have a predetermined length so that, as shown in FIGS. 3 and 4, the axial pawl control member 520 is selectively positioned on a right inner peripheries of the third pawls 503 in the figures, while the carrier 413 of the planetary gear set 410 is positioned on left inner peripheries of the third pawls 503 in the figures.

The axial pawl control member 520 is a component axially movable by the control unit 500 as will be described later. When the axial pawl control member 520 is moved to the left side as shown in FIG. 3, the third pawls 503 are laid down and are then maintained by the axial pawl control member 520 as shown in FIG. 13, so that the rotational force from the driver 200 cannot be transferred directly to the carrier 413.

On the contrary, when the axial pawl control member 520 is moved to the right side in the figure so as to be spaced apart from the third pawls as shown in FIG. 4, the third pawls 503 are erected inwardly as shown in FIG. 14, so that the third pawls 503 are engaged with the teeth 413a formed on an outer periphery of the carrier 413, thereby enabling direct transfer of the rotational force from the driver 200 to the carrier 413.

Hereinafter, it will be described how user's shifting manipulation for such control is transferred to the circumferential pawl control member 510 and the axial pawl control member 520.

As shown in FIG. 16, the control unit 500 in the present invention includes a cable connecting member 530, wherein a cable to be withdrawn by means of the manipulation of the shift lever is connected to the cable, connecting member and the cable connecting member is rotationally supported on the outer peripheral surface of the shaft 100; an intermediate connecting member 532 which is engaged with an inner peripheral surface of the cable connecting member 530 to be integrally rotated therewith; a penetrating connecting member 540 which is assembled onto an inner peripheral surface of the intermediate connecting member 532 to be integrally rotated therewith and is unidirectionally and elastically rotated by a return spring 803; an angle control member 550 which is fitted into the penetrating connecting member 540 and controlled to be integrally rotated therewith and has helical slant surfaces formed on one side of the angle control member 550; a circumferential pawl control member 510 which is connected to the angle control member 550 so as to control the plurality of pawls located in the pawl seating portions of the shaft 100 depending on the rotation of the angle control member 550; and an axial pawl control member 520 which is guided by an axial guide grooves 561 of a guide member 560 fixed to the shaft 100 so that the axial pawl control member 520 can be axially moved, wherein the axial pawl control member 520 is axially moved along the helical slant surfaces 551 depending on the rotation of the angle control member 550, thereby controlling the pawls provided on the inner peripheral surface of the driver 200.

The cable (not shown) which is pulled by the manipulation of the shift lever is connected to the cable connecting member 530, so that the cable connecting member 530 is rotated counterclockwise (when viewed from the right side) upon manipulation of the shift lever.

In addition, the intermediate connecting member 532 is positioned on the inner peripheral surface of the cable connecting member 530, and the inner peripheral surface of the cable connecting member 530 and an outer peripheral surface of the intermediate connecting member 532 are engaged with each other so that they can be integrally rotated.

Further, the penetrating connecting member 540 is assembled on the inner peripheral surface of the intermediate connecting member 532.

That is, two protrusions 542 are protrudingly formed at a right end of the penetrating connecting member 540 so that the two protrusions 542 are fitted into coupling recesses 532a formed on the inner peripheral surface of the intermediate connecting member 532, whereby the intermediate connecting member 532 and the penetrating connecting member 540 are integrally rotated.

In addition, two other protrusions 541 are protrudingly formed at a left end of the penetrating connecting member 540 so that the two protrusions 542 are fitted into coupling recesses 552 formed on the inner peripheral surface of the angle control member 550, whereby the penetrating connecting member 540 and the angle control member 550 are integrally rotated on the outer periphery of the shaft 100.

A plurality of helical slant surfaces 551 are formed circumferentially at a predetermined interval on the right side of the angle control member 550 in the figure.

Further, the guide member 560 that is fixed to the shaft 100 and thus is not rotatable is positioned on an outer periphery of the penetrating connecting member 540. The guide member 560 is provided with the axial guide grooves 561 which are axially formed with a predetermined depth.

Accordingly, the axial pawl control member 520 is positioned between the angle control member 550 and the guide member 560.

The axial pawl control member 520 has rims 522 formed inside the axial pawl control member 520 so that the rims 522 are to be positioned within the axial guide grooves 561 of the guide member 560. Distal ends of the rims 522 are inclined to be brought into contact with the helical slant surfaces 551 of the angle control member 550.

Accordingly, if the angle control member 550 is rotated counterclockwise through a predetermined angle or more, the axial pawl control member 520 is prevented from being rotated by the guide member 560 fixed to the shaft 100 and thus is axially moved along the axial guide grooves 561 of the guide member 560, i.e., toward the right side in the figure.

In addition, an axial return spring 801 is provided between the guide member 560 and the axial pawl control member 520, so that the axial return spring 801 serves to return the axial pawl control member 520, which has been moved to the right side as described above, to the left side.

In particular, the axial pawl control member 520 preferably has a generally circular outer peripheral surface with axially inclined surface sections 523 and 524 and a subsequent circular surface section along the axial direction of the outer peripheral surface so as to come into contact with the pawls provided on the inner peripheral surface of the driver 200, so that upon movement of the axial pawl control member 520 in one direction, the axial pawl control member 520 is spaced away from the pawls provided on the inner peripheral surface of the driver 200 and the pawls provided on the inner peripheral surface of the driver 200 are allowed to be erected, and upon return of the axial pawl control member 520 in an opposite direction by the axial return spring 801, the pawls provided on the inner peripheral surface of the driver 200 are caused to be laid down by the inclined surface sections 523 and 524 and then remain in the laid-down state by the circular surface section of the outer peripheral surface.

That is, as the rotation of the angle control member 550 causes the axial pawl control member 520 to be moved to the right side in the figure while riding on the helical slant surfaces 551, the axial pawl control member 520 is spaced apart from the third pawls 503 so that the third pawls 503 are erected as shown in FIG. 14. Accordingly, the third pawls 503 are engaged with the teeth 413a formed on the carrier 413, whereby the rotational force of the driver 200 can be transferred directly to the carrier 413 without being shifted.

On the contrary, when the axial return spring 801 causes the axial pawl control member 520 to be moved to the left side in the figure, the erected third pawls 503 are moved while riding on the inclined surface sections 523 and 524 and brought into contact with the circular surface section of the outer peripheral surface of the axial pawl control member 520, and then laid down as shown in FIG. 13, so that the engagement between the third pawls 503 and the carrier 413 is released, thereby releasing the direct coupling between the driver 200 and the carrier 413.

Further, the return spring 803 is provided between the guide member 560 and the penetrating connecting member 540 as shown in FIG. 16, so that one end of the return spring 803 is bended and inserted into an assembly hole 562 formed in the guide member 560 while the other end of the return spring 803 is bended and inserted into an assembly hole 543 formed in the penetrating connecting member 540. Thus, the penetrating connecting member 540 is elastically supported to be rotated clockwise when viewed from the right side with respect to the guide member 560.

Accordingly, the return spring 803 causes the penetrating connecting member 540, which have been rotated counterclockwise upon acceleration manipulation of the shift lever, to be elastically rotated clockwise upon deceleration manipulation of the shift lever.

Further, the circumferential pawl control member 510 is connected to the left side of the angle control member 550 in the figure, so that the circumferential pawl control member 510 can be rotated depending on the rotation of the angle control member 550, thereby selectively erecting the first pawl 501, the second pawl 502, the fourth pawl 504 and the fifth pawl 505.

The grooves 511, 512, 514 and 515 are formed on the inner peripheral surface of the circumferential pawl control, member 510 so that the rotation of the circumferential pawl control member 510 causes the first pawl 501, the second pawl 502, the fourth pawl 504 and the fifth pawl 505 to sequentially escape from the grooves 511, 512, 514 and 515 to be erected, respectively. It is preferred that the axial displacement of the axial pawl control member 520 occurs before the fourth pawl 504 escapes from the groove 514.

That is, the rotation of the circumferential pawl control member 510 results in shifting to the respective shifting ratios of the first and second stages, the axial pawl control member 520 is axially moved at the shifting ratio of the third stage, and shifting to the respective shifting ratios of the fourth, and fifth stages is then achieved.

In a loaded, driven travel state, however, the first pawl 501, the second pawl 502, the fourth pawl 54 and the fifth pawl 505 are not allowed to be laid down within the pawl seating portions 101, 102, 104 and 105 of the shaft 100 if the pawls 501, 502, 504 and 505 are strongly engaged with the inner teeth of the sun gear, or the third pawls 503 are not allowed to be laid down within the pawl seating portions 203 formed on the inner peripheral surface of the driver 200 if the third pawls 503 are strongly engaged with the teeth 413a of the carrier 413, whereby there may be a phenomenon that shifting cannot be smoothly achieved.

To solve this problem, the hub-embedded multi-stage transmission according to the present invention is further provided with a circumferential forced shift means for achieving forced shifting by means of the first pawl 501, the second pawl 502, the fourth pawl 504 and the fifth pawl 505 and an axial forced shift means for achieving forced shifting by means of the third pawls 503.

Circumferential Forced Shift Means

Hereinafter, a deceleration operation from the second stage to the first stage will be described by way of example. Since this deceleration operation is equally applied to all other deceleration operations from the fifth stage to the fourth stage and from the fourth stage to the third stage, repeated descriptions of the other deceleration operations will be omitted.

The control unit 500 of the hub-embedded multi-stage transmission in the present invention preferably includes a circumferential forced shift means. The circumferential forced shift means includes, as shown in FIG. 17, a plurality of rotation restricting protrusions 516 and a plurality of unidirectionally inclined recesses 517 formed on an outer peripheral surface of the circumferential pawl control member 510; rotation restricting depressions 553 formed on an outer peripheral edge of the angle control member 550 for accommodating the rotation restricting protrusions 516 with a free play; a plurality of rollers 554 supported in a radially floatable manner by the angle control member 550; and a circumferential return spring 802 connected between the circumferential pawl control member 510 and the angle control member 550 for elastically supporting the circumferential pawl control member 510 to be rotated in one direction with respect to the control unit 500. The hub-embedded multi-stage transmission preferably has a circumferential forced shift function which ensures that as a difference in phase angle between the angle control member 550 and the circumferential pawl control member 510 is generated, the rollers 554 are forcibly moved out of the unidirectionally inclined recesses 517 formed on the outer peripheral surface of the circumferential pawl control member 510, which is positioned inwards with respect to inner peripheries of the rollers and rotated, so as to form a forced shift clutch that is in contact with an inner peripheral surface of the carrier 413, thereby forcibly rotating the circumferential pawl control member 510 to cause at least one of the plurality of pawls located in the pawl seating portions of the shaft 100 to be forcibly laid down.

That is, the rotation restricting protrusions 516 protruding on the outer peripheral surface of the circumferential pawl control member 510 have a width slightly narrower than that of the rotation restricting depressions 553 of the angle control member 550, so that a certain difference in phase angle, may be generated between the circumferential pawl control member 510 and the angle control member 550.

Both ends of the circumferential return spring 802 are perpendicularly bent to be inserted into an assembly hole 518 formed in the circumferential pawl control member 510 and an assembly hole 555 formed in the angle control member 550, respectively, as shown in FIG. 16.

Accordingly, the circumferential pawl control member 510 is elastically supported to be always rotated clockwise with respect to the angle control member 550, and the rotation restricting protrusions 516 are positioned within the rotation restricting depressions 553 and always rotated clockwise unless any exterior force is applied thereto, thereby maintaining a contact state as shown in FIG. 17 (a).

When the shift lever is manipulated for shifting to a lower stage in this state, the angle control member 550 is rotated clockwise by the return spring 803. As the angle control member 550 is rotated clockwise, the circumferential pawl control member 510 is also rotated clockwise by the circumferential return spring 802, thereby achieving shifting for deceleration.

However, if the second pawl 502 is strongly engaged with the inner teeth of the first sun gear 411a, the circumferential pawl control member 510 cannot be rotated together with the angle control member 550 and a certain difference in phase angle may be then generated, as shown in FIG. 17 (b). In this case, the rollers 554 are brought into contact with the unidirectionally inclined recesses 517 and then protrude outwards, so that the rollers 554 are brought into contact with the inner peripheral surface of the carrier 413 which is rotated outside with respect to the rollers 554.

Accordingly, the rollers 554 and the unidirectionally inclined recesses 517 constitute the forced shift clutch, so that the rotational force of the carrier 413 is transferred to the circumferential pawl control member 510 which in turn causes the circumferential pawl control member 510 to be strongly rotated clockwise as shown in FIG. 17 (c).

As a result, the circumferential pawl control member 510 is rotated clockwise to forcibly cause the second pawl 502, which has been strongly engaged with the inner teeth of the first sun gear 411a, to be laid down, thereby providing the circumferential forced shift function.

Axial Forced Shift Means

An axial forced shift function may be produced only when shifting is, made from the third stage to the second stage in this embodiment.

The hub-embedded multi-stage transmission according to the present invention is most preferably provided with an axial forced shift means constructed such that the axial pawl control member 520 is formed with pawl accommodating grooves 521 circumferentially distributed to form a polygon and led to the circular surface section of the outer peripheral surface, so that the pawl accommodating groove 521 can accommodate the pawls provided on the inner peripheral surface of the driver 200 in their erected state and guide the pawls to the circular surface section of the outer peripheral surface, thereby forcibly causing the pawls provided on the inner peripheral surface of the rotating driver 200 to be laid down.

That is, since the axial pawl control member 520 is basically provided with the inclined surface sections 523 and 524 for causing the third pawls 503 to be laid down, the erected third pawls 503 are caused to be laid down when the axial pawl control member 520 is moved while riding on the helical slant surfaces 551 of the angle control member 550 and then returned by the axial return spring 801.

However, if the third pawls 503 are strongly engaged with the teeth 413a of the carrier 413, there may be a case where the axial pawl control member 520 cannot be returned only by an elastic force of the axial return spring 801.

To solve this problem, the axial pawl control member 520 is further, provided with the pawl accommodating grooves 521 for accommodating the erected third pawls 503 and guiding the third pawls 503 onto the circular surface section of the outer peripheral surface.

The pawl accommodating grooves 521 forms the polygon that generally inscribes the circular outer peripheral surface as shown in FIGS. 13 and 14.

Accordingly, the third pawls 503 that are rotated in their erected state outside with respect to the axial pawl control member 520 enter the pawl accommodating grooves 521 as shown in FIG. 18 (a). Then, when the third pawls 503 are rotated, as shown in FIGS. 18 (b) and 18 (c), the third pawls 503 are gradually moved toward edges of the pawl accommodating grooves 521 and then gradually laid down.

Thereafter, when the third pawls 503 approach the edges of the pawl accommodating grooves 521, the third pawls 503 escape from the pawl accommodating grooves 521 and are guided onto the circular surface section of the outer peripheral surface between the pawl accommodating grooves 521 which are adjacent to each other, resulting in a state where the third pawls 503 are completely laid down as shown in FIG. 18 (d).

Accordingly, if the erected third pawls 503 and the carrier 413 are strongly engaged with each other, the third pawls 503 are first inserted into the pawl accommodating grooves 521 and the third pawls 503 and the driver 200 are integrally rotated to forcibly release the engagement of the third pawls 503 with the carrier 413, thereby facilitating a leftward movement of the axial pawl control member 520.

It is preferred that the pawl accommodating grooves 521 defined in the axial pawl control member 520 are formed with a plurality of inclined surfaces to cause the third pawls 503 to be easily pushed out of the pawl accommodating grooves 521. One example of the present invention is illustrated as having 8 pawl accommodating grooves 521.

In FIG. 12, there are shown controlled states of the first pawl 501, the second pawl 502, the fourth pawl 504 and the fifth pawl 505 depending on control angles of the circumferential pawl control member 510 and the axial pawl control member 520. These control states are summarized in Table 1 below.

Table 1 below also shows whether the first output clutch 420 and the second output clutch 430 transfer a rotational force depending on the operations of the respective pawls in an embodiment employing the two-stage planetary gear set 410:

TABLE 1

| Stage | First Pawl | Second Pawl | Third Pawl | Fourth Pawl | Fifth Pawl | First Output Clutch | Second Output Clutch Inner Side One-way Clutch | Second Output Clutch Outer Side One-way Clutch |
|---|---|---|---|---|---|---|---|---|
| 1st | O | X | X | X | X | O | O | X |
| 2nd | OX | O | X | X | X | O | O | X |
| 3rd | OX | OX | O | X | X | O | F | F |
| 4th | X | X | O | O | X | X | O.R. | O |
| 5th | X | X | O | OX | O | X | O.R. | O | wherein, F represents a free state, O.R. represents an overrunning state, O represents an ON state, X represents an OFF state, and OX represents an ON or OFF state.

Further, the hub shell 300 and the driver 200 may be configured to be independently rotated to each other by a bearing 905 positioned therebetween, and they are protected from entry of foreign substances thereinto by a dust cover 310.

Although the bearings 903, 904 and 905 described above are illustrated as ball bearings, other kinds of bearings such as a sliding bearing may be used without being limited thereto.

Hereinafter, operations of an embodiment of the hub-embedded multi-stage transmission according to the present invention, which employs the two-stage planetary gear set 410, will be described with reference to the drawings while distinguishing a first stage of the lowest speed, a second stage of a lower speed, a third stage having no change in speed, a fourth stage of a higher speed, and a fifth stage of the highest speed from one another.

First Stage

The first stage is an initial state where the shift lever is not manipulated, the second sun gear 411b is confined with only the first pawl 501 erected, and the axial pawl control member 520 has been located at a position moved to the left side in the figure.

When a driving force is transferred through the sprocket 210 in this state, the driver 200 is rotated.

The third pawls 503 provided in the driver 200 are merely rotated while being in contact with the outer peripheral surface of the axial pawl control member 520 and cannot transfer the rotational force of the driver 200 directly to the carrier 413 of the planetary gear set 410.

Accordingly, the rotational force of the driver 200 is transferred through the inner side one-way clutch of the second output clutch 430 to the ring gear 414 of the planetary gear set 410, whereas the outer side one-way clutch cannot transfer the rotational force due to a certain difference in phase angle. Thereafter, the smaller-diameter portion 412b of the planetary gear 412 is engaged with the fixed second sun gear 411b and thus the planetary gear 412 is rotated thereabout.

The carrier 413 is decelerated to and rotated at a minimum speed, and this rotation is transferred through the first output clutch 420 to the inner peripheral surface of the hub shell 300, thereby making an output.

In summary, as the first pawl 501 confines the second sun gear 411b in the first stage, the rotational force is transferred via the sprocket 210→the driver 200→the inner side one-way clutch of the second output clutch 430→the ring gear 414→the smaller-diameter portion 412b of the planetary gear 412→the carrier 413→the first output clutch 420→the hub shell 300, thereby achieving deceleration to the minimum speed.

Second Stage

The second stage is a state where the shift lever is manipulated such that the circumferential pawl control member 510 is rotated through a predetermined degree, the first sun gear 411a is confined with the second pawl 502 erected, and the axial pawl control member 520 remains at the position moved to the left side in the figure.

When a driving force is transferred through the sprocket 210 in this state, the driver 200 is rotated.

The third pawls 503 provided in the driver 200 are merely rotated while being in contact with the outer peripheral surface of the axial pawl control member 520 and cannot transfer the rotational force of the driver 200 directly to the carrier 413 of the planetary gear set 410 as well.

Accordingly, the rotational force of the driver 200 is transferred through the inner side one-way clutch of the second output clutch 430 to the ring gear 414 of the planetary gear set 410, and the larger-diameter portion 412a of the planetary gear 412 is engaged with the fixed first sun gear 411a and thus the planetary gear 412 is rotated thereabout.

The carrier 413 is decelerated to and rotated at a lower speed, and this rotation is transferred through the first output clutch 420 to the inner peripheral surface of the hub shell 300, thereby making an output.

In summary, as the second pawl 502 confines the first sun gear 411a in the second stage, the rotational force is transferred via the sprocket 210→the driver 200→the inner side one-way clutch of the second output clutch 430→the ring gear 414 the larger-diameter portion 412a of the planetary gear 412→the carrier 413→the first output clutch 420→the hub shell 300, thereby achieving deceleration to a lower speed.

Third Stage

The third stage is a state where the shift lever is manipulated to cause the circumferential pawl control member 510 to be rotated further by a predetermined degree, neither the first sun gear 411a nor the second sun gear 411b are confined, and the axial pawl control member 520 is moved, to the right side in the figure so that the third pawls 503 are erected, as shown in FIG. 4.

When a driving force is transferred through the sprocket 210 in this state, the driver 200 is rotated.

The third pawls 503 provided on the driver 200 are spaced apart from the axial pawl control member 520 which has been moved to the right side in the figure, so that the third pawls 503 are erected. Therefore, the rotational force of the driver 200 is transferred directly to the carrier 413 of the planetary gear set 410.

Accordingly, the second output clutch 430 is not allowed to transfer a separate rotational force, and the carrier 413 is rotated by directly receiving the rotational force, which has been input to the driver 200, without any change in the rotational force. This rotation is transferred through the first output clutch 420 to the inner peripheral surface of the hub shell 300, thereby making an output.

In, summary, as the rotational force of the driver 200 is transferred directly to the carrier 413 of the planetary gear set 410 only by means of the third pawls 503 without confinement of both the first sun gear 411a and the second sun gear 411b in the third stage, the rotational force is transferred via the sprocket 210→the driver 200→the third pawls 503→the carrier 413→the first output clutch 420→the hub shell 300, thereby making an output without any change in speed.

Fourth Stage

The fourth stage is a state where the shift lever is manipulated to cause the circumferential pawl control member 510 to be rotated further by a predetermined degree, the first sun gear 411a is confined with the fourth pawl 504 erected, and the axial pawl control member 520 remains at the position moved to the right side in the figure so that the third pawls 503 are in the erected condition as it is.

When a driving force is transferred through the sprocket 210 in this state, the driver 200 is rotated.

The third pawls 503 provided on the driver 200 are spaced apart from the axial pawl control member 520 which has been moved to the right side in the figure, so that the third pawls 503 remains in the erected condition. Accordingly, the rotational force of the driver 200 is transferred directly to the carrier 413 of the planetary gear set 410.

When the rotational force is transferred directly to the carrier 413 without any change in speed, the larger-diameter portion 412a of the planetary gear 412 is engaged with the fixed first sun gear 411a and thus the planetary gear 412 is rotated at a higher speed thereabout.

This rotation of the planetary gear 412 is transferred to the ring gear 414 and through the outer side one-way clutch of the second output clutch 430 to the inner peripheral surface of the hub shell 300, thereby making an output.

In summary, as the first sun gear 411a is confined and the rotational force of the driver 200 is transferred directly to the carrier 413 of the planetary gear set 410 by the third pawls 503 in the fourth stage, the rotational force is transferred via the sprocket 210→the driver 200→the third pawls 503→the carrier 413→the larger-diameter portion 412a of the planetary gear 412→the ring gear 414→the outer side one-way clutch of the second output clutch 430→the hub shell 300, thereby achieving acceleration to a higher speed and making an output.

The inner side one-way clutch of the second output clutch 430 cannot transfer the rotational force of the driver 200 to the ring gear 414 due to overrunning.

Fifth Stage

The fifth stage is a state where the shift lever is manipulated to cause the circumferential pawl control member 510 to be rotated further by a predetermined degree, the second sun gear 411b is confined with the fifth pawl 505 erected, and the axial pawl control member 520 remains at the position moved to the right side in the figure so that the third pawls 503 are in the erected condition.

When a driving force is transferred through the sprocket 210 in this state, the driver 200 is rotated.

The third pawls 503 provided on the driver 200 remains spaced apart from the axial pawl control member 520 that has been moved to the right side in the figure, so that the third pawls 503 remains in the erected condition. Accordingly, the rotational force of the driver 200 is transferred directly to the carrier 413 of the planetary gear set 410.

When the rotational force is transferred directly to the carrier 413 without any change in speed, the smaller-diameter portion 412b of the planetary gear 412 is engaged with the fixed second sun gear 411b and thus the planetary gear 412 is rotated at a maximum speed.

This rotation of the planetary gear 412 is transferred to the ring gear 414 and through the outer side one-way clutch of the second output clutch 430 to the inner peripheral surface of the hub shell 300, thereby making an output.

In summary, as the second sun gear 411b is confined and the rotational force of the driver 200 is transferred directly to the carrier 413 of the planetary gear set 410 by the third pawls 503 in the fifth stage, the rotational force is transferred via the sprocket 210→the driver 200→the third pawls 503→the carrier 413→the smaller-diameter portion 412b of the planetary gear 412→the ring gear 414→the outer side one-way clutch of the second output clutch 430→the hub shell 300, thereby achieving acceleration to the maximum speed and making an output.

Even at this stage, the inner side one-way clutch of the second output clutch 430 cannot transfer the rotational force of the driver 200 to the ring gear 414 due to overrunning.

Accordingly, the hub-embedded multi-stage transmission of the present invention has superior advantages in that a compact hub-embedded multi-stage transmission can be implemented using a multi-stage planetary gear set having a one stage or two or more stages and a double one-way clutch so as to enhance product marketability; and the circumferential pawl control member 510 and the axial pawl control member 520 are controlled depending on the manipulation of the shift lever so as to change a transfer route of the rotational force, thereby obtaining various shifting ratios.

Further, with the circumferential forced shift function and the axial forced shift function, the pawls can be forcibly laid down upon deceleration manipulation, so that shifting is smoothly performed, thereby considerably improving shifting accuracy The above embodiment is merely an example for better understanding of the technical spirit of the present invention, and the scope of the present invention is not limited to the embodiments or drawings.

The invention claimed is:

1. A hub-embedded multi-stage transmission, comprising:
a shaft (100) which is fixed to a vehicle body;
a driver (200) which is rotatably located on an outer periphery of the shaft (100) to receive a rotational force;
a hub shell (300) which is rotatably located on an outer periphery of the shaft (100) to output the rotational force;
a shifting unit (400) which changes the rotational force inputted to the driver (200) and outputs the changed rotational force to the hub shell (300),
wherein the shifting unit (400) comprises:
a planetary gear set (410) composed of a sun gear, a planetary gear (412), a carrier (413) and a ring gear (414) provided within the hub shell (300),
a first output clutch (420) provided as a one-way clutch between the carrier (413) and the hub shell (300), and
a second output clutch (430) provided as two one-way clutches integrally formed with each other to have a preset difference in phase angle and positioned between the driver (200) and the ring gear (414) and between the ring gear (414) and the hub shell (300), respectively, whereby the rotational force of the driver (200) is transferred to the ring gear (414) or the rotational force of the ring gear (414) is transferred to the hub shell (300) depending on a difference in rotational speed; and
a control unit (500) which controls shifting of the shifting unit (400),
wherein the control unit (500) comprises:
a circumferential pawl control member (510) circumferentially rotatable to control a plurality of pawls located in pawl seating portions formed on an outer peripheral surface of the shaft (100) depending on manipulation of a shift lever, thereby selectively restricting the rotation of the sun gear, and
an axial pawl control member (520) axially movable to control pawls provided on an inner peripheral surface of the driver (200) depending on the manipulation of the shift lever, thereby selectively transferring the rotation of the driver (200) to the carrier (413).

2. The hub-embedded multi-stage transmission according to claim 1, wherein the second output clutch (430) comprises:
unidirectionally inclined recesses (414a, 414b) formed to have a preset difference in phase angle on the inner and outer peripheral surfaces of the ring gear (414); and
a cage (433) for rotationally supporting a plurality of rollers (431a, 431b) to be (431a) located on an inner periphery of the cage (433) and the rollers (431b) located on an outer periphery of the cage (433) are integrally formed with the cage to maintain a preset difference in phase angle,
whereby the second output clutch (430) comprises the two one-way clutches having an inner side one-way clutch formed between the outer peripheral surface of the driver (200) and the inner peripheral surface of the ring gear (414) and an outer side one-way clutch formed between the outer peripheral surface of the ring gear (414) and the inner peripheral surface of the hub shell (300).

3. The hub-embedded multi-stage transmission according to claim 2, wherein the planetary gear (412) comprises a one-stage planetary gear or a multi-stage planetary gear having two or more stages, and the pawls and the sun gear are provided depending on the number of stages of the planetary gear, whereby the planetary gear (412 performs shifting in stages of 2×the number of stages of the planetary gear+1.

4. The hub-embedded multi-stage transmission according to claim 3, wherein the control unit (500) comprises:
a cable connecting member (530), a cable to be withdrawn by means of the manipulation of the shift lever being connected to the cable connecting member, and the cable connecting member being rotationally supported on the outer peripheral surface of the shaft (100);
an intermediate connecting member (532) engaged with an inner peripheral surface of the cable connecting member (530) to be integrally rotated;
a penetrating connecting member (540) assembled on an inner peripheral surface of the intermediate connecting member (532) to be integrally rotated, wherein the penetrating connecting member (540) is unidirectionally and elastically rotated by a return spring (803);
an angle control member (550) fitted into the penetrating connecting member (540) to be controlled to be integrally rotated, wherein helical slant surfaces (551) are formed to one side of the angle control member (550);
the circumferential pawl control member (510) connected to the angle control member (550) for controlling the plurality of pawls located on the pawl seating portions of the shaft (100) depending on the rotation of the angle control member (550); and
the axial pawl control member (520) guided by an axial guide groove (561) of a guide member (560) fixed to the shaft (100) so that the axial pawl control member (520) may be axially moved, wherein the axial pawl control member (520) is axially moved along the helical slant surfaces (551) depending on the rotation of the angle control member (550) to control the pawls provided on the inner peripheral surface of the driver (200).

5. The hub-embedded multi-stage transmission according to claim 4, the axial pawl control member (520) has a generally circular outer peripheral surface with axially inclined surface sections (523, 524) and a subsequent circular surface section along the axial direction of the outer peripheral surface so as to come into contact with the pawls provided on the inner peripheral surface of the driver (200), so that upon movement of the axial pawl control member (520) in one direction, the axial pawl control member (520) is spaced away from the pawls provided on the inner peripheral surface of the driver (200) and the pawls provided on the inner peripheral surface of the driver (200) are allowed to be erected, and upon return of the axial pawl control member (520) in an opposite direction by an axial return spring (801), the pawls provided on the inner peripheral surface of the driver (200) are caused to be laid down by the inclined surface sections (523, 524) and then remain in the laid-down state by the circular surface section of the outer peripheral surface.

6. The hub-embedded multi-stage transmission according to claim 5, wherein the control unit (500) comprises a circumferential forced shift means, wherein the circumferential forced shift means comprises a plurality of rotation restricting protrusions (516) and a plurality of unidirectionally inclined recesses (517) formed on an outer peripheral surface of the circumferential pawl control member (510); rotation restricting depressions (553) formed on an outer peripheral edge of the angle control member (550) for accommodating the rotation restricting protrusions (516) with a free play; a plurality of rollers (554) supported in a radially floatable manner by the angle control member (550); and a circumferential return spring (802) connected between the circumferential pawl control member (510) and the angle control member (550) for elastically supporting the circumferential pawl control member (510) to be rotated in one direction with respect to the control unit (500), and wherein the hub-embedded multi-stage transmission has a circumferential forced shift function ensuring that as a difference in phase angle between the angle control member (550) and the circumferential pawl control member (510) is generated, the rollers (554) are forcibly moved out of the unidirectionally inclined recesses (517) formed on the outer peripheral surface of the circumferential pawl control member (510) positioned inwards with respect to inner peripheries of the rollers and rotated, so as to form a forced shift clutch that is in contact with an inner peripheral surface of the carrier (413), thereby forcibly rotating the circumferential pawl control member (510) to cause at least one of the plurality of pawls located in the pawl seating portions of the shaft (100) to be forcibly laid down.

7. The hub-embedded multi-stage transmission according to claim 5, further comprising an axial forced shift means constructed such that the axial pawl control member (520) is formed with pawl accommodating grooves (521) circumferentially distributed to form a polygon and led to the circular surface section of the outer peripheral surface, so that the pawl accommodating groove (521) can accommodate the pawls provided on the inner peripheral surface of the driver (200) in their erected state and guide the pawls to the circular surface section of the outer peripheral surface, thereby forcibly causing the pawls provided on the inner peripheral surface of the rotating driver (200) to be laid down.

* * * * *